United States Patent
Watanabe et al.

(10) Patent No.: US 12,096,493 B2
(45) Date of Patent: Sep. 17, 2024

(54) SYSTEM, CONTROL PLANE DEVICE, USER PLANE DEVICE AND COMPUTER READABLE STORAGE MEDIUM

(71) Applicant: SoftBank Corp., Tokyo (JP)

(72) Inventors: Satoshi Watanabe, Chiba (JP); Kazuya Tabuchi, Tokyo (JP); Atsushi Miyairi, Tokyo (JP); Tomohiro Yokoyama, Tokyo (JP)

(73) Assignee: SoftBank Corp., Tokyo (JP)

( * ) Notice: Subject to any disclaimer, the term of this patent is extended or adjusted under 35 U.S.C. 154(b) by 698 days.

(21) Appl. No.: 17/203,801

(22) Filed: Mar. 17, 2021

(65) Prior Publication Data

US 2021/0204334 A1 Jul. 1, 2021

Related U.S. Application Data

(63) Continuation of application No. PCT/JP2019/038004, filed on Sep. 26, 2019.

(30) Foreign Application Priority Data

Sep. 26, 2018 (JP) ................... 2018-179691

(51) Int. Cl.
  *H04W 76/10* (2018.01)
  *H04L 61/5007* (2022.01)
  *H04W 48/16* (2009.01)

(52) U.S. Cl.
  CPC ......... *H04W 76/10* (2018.02); *H04L 61/5007* (2022.05); *H04W 48/16* (2013.01)

(58) Field of Classification Search
  None
  See application file for complete search history.

(56) References Cited

U.S. PATENT DOCUMENTS 9,860,934 B2 * 1/2018 Stojanovski .......... H04W 16/32
10,587,503 B2    3/2020 Yu
(Continued)

FOREIGN PATENT DOCUMENTS

CN    106993067 A    7/2017
CN    108494612 A    9/2018
(Continued)

OTHER PUBLICATIONS (ISA/237) Written Opinion of the International Search Authority for International Patent Application No. PCT/JP2019/038004, issued/mailed by the Japan Patent Office on Dec. 17, 2019.

(Continued)

*Primary Examiner* — Phirin Sam

(57) ABSTRACT

Provided is a system, comprising: a control plane device; and a plurality of user plane devices, wherein the control plane device including: a request receiving unit for receiving a session generating request transmitted by a mobility management device, which has received a connection request from a user terminal; a user plane device selection unit for selecting a user plane device corresponding to the user terminal from the plurality of user plane devices, based on the session generating request; an address acquiring unit for obtaining an IP address assigned to the user terminal based on the session generating request; and a response transmission unit for transmitting a session generating response including the IP address assigned to the user terminal, identification information and IP address of the user plane device selected by the user plane device selection unit, and IP address of a PGW-U.

20 Claims, 14 Drawing Sheets

(56) References Cited

U.S. PATENT DOCUMENTS

| | | | |
|---|---|---|---|
| 10,671,441 B2 | 6/2020 | Ohta | |
| 10,728,829 B2 | 7/2020 | Xu | |
| 11,102,170 B2 | 8/2021 | Long | |
| 11,917,701 B2* | 2/2024 | Kedalagudde | H04W 76/15 |
| 2011/0280215 A1 | 11/2011 | Nakagawa | |
| 2017/0048876 A1* | 2/2017 | Mahindra | H04L 12/407 |
| 2017/0208634 A1* | 7/2017 | Bharatia | H04W 76/11 |
| 2017/0303228 A1* | 10/2017 | Watfa | H04W 76/10 |
| 2018/0199398 A1 | 7/2018 | Dao | |
| 2018/0368050 A1* | 12/2018 | Chun | H04M 15/63 |
| 2019/0386894 A1* | 12/2019 | Hu | H04L 41/50 |
| 2019/0394128 A1* | 12/2019 | Yang | H04L 69/325 |
| 2020/0029199 A1* | 1/2020 | Sen | H04L 41/0806 |
| 2020/0267007 A1* | 8/2020 | Hoffmann | H04L 12/1403 |
| 2021/0227595 A1* | 7/2021 | Kuroda | H04W 88/16 |
| 2022/0060947 A1* | 2/2022 | Iwai | H04W 36/0022 |
| 2022/0078247 A1* | 3/2022 | Yang | H04W 4/20 |
| 2022/0103642 A1* | 3/2022 | Yu | H04W 76/11 |
| 2022/0338083 A1* | 10/2022 | Stojanovski | H04W 36/28 |

FOREIGN PATENT DOCUMENTS

| | | |
|---|---|---|
| DE | 112016004118 T5 | 6/2018 |
| JP | 2011239272 A | 11/2011 |
| JP | 2017175264 A | 9/2017 |
| WO | 2014161780 A1 | 10/2014 |
| WO | 2017043204 A1 | 3/2017 |
| WO | 2017094246 A1 | 6/2017 |
| WO | 2017110650 A1 | 6/2017 |
| WO | 2017173587 A1 | 10/2017 |
| WO | 2017176307 A1 | 10/2017 |
| WO | 2018166335 A1 | 9/2018 |

OTHER PUBLICATIONS

Office Action issued for counterpart Japanese Application No. 2018-179691, issued by the Japan Patent Office on Apr. 23, 2019 (drafted on Apr. 12, 2019).

Ericsson, "UE IP address allocation", 3GPP TSG-SA WG2#113 S2-160149,3GPP,Jan. 19, 2016.

(ISA/237) Written Opinion of the International Search Authority for International Patent Application No. PCT/JP2019/005557, issued/mailed by the Japan Patent Office on Apr. 23, 2019.

Office Action issued for counterpart Indian Application No. 202117018828, drafted by the India Intellectual Property Office on Feb. 22, 2022.

Extended European Search Report for European Patent Application No. 19864587.1, issued by the European Patent Office on Oct. 8, 2021.

Office Action issued for counterpart Chinese Application 201980061210. 2, issued by The State Intellectual Property Office of People's Republic of China on Dec. 26, 2023.

Vodafone, User plane function selection for URLLC, https://www. 3gpp.org/ftp/tsg_sa/WG2_Arch/TSGS2_124_Reno/Docs, SA WG2 Meeting #124, S2-178596, Nov. 27-Dec. 1, 2017, Reno, NV, USA.

* cited by examiner

SYSTEM, CONTROL PLANE DEVICE, USER PLANE DEVICE AND COMPUTER READABLE STORAGE MEDIUM

The contents of the following Japanese and PCT applications are incorporated herein by reference:
NO. 2018-179691 filed in JP on Sep. 26, 2018, and
NO. PCT/JP2019/038004 filed in WO on Sep. 26, 2019.

BACKGROUND

1. Technical Field

The present invention relates to a system, a control plane device, a user plane device and a computer readable storage medium.

2. Related Art

MEC (Mobile Edge Computing) has been known as a network architecture in which a cloud computing capability and IT service environment is placed at the edge of a cellular network (for example, refer to Patent Document 1).

Prior Art Document

[Patent Document]
Patent Document 1: Japanese Patent Application Publication No. 2017-175264

DESCRIPTION OF EXEMPLARY EMBODIMENTS

Hereinafter, the present invention will be described through embodiments of the invention. However, the following embodiments do not limit the invention defined in the claims. Also, all combinations of features described in the embodiments are not necessarily essential to solutions of the invention.

Figure 1:
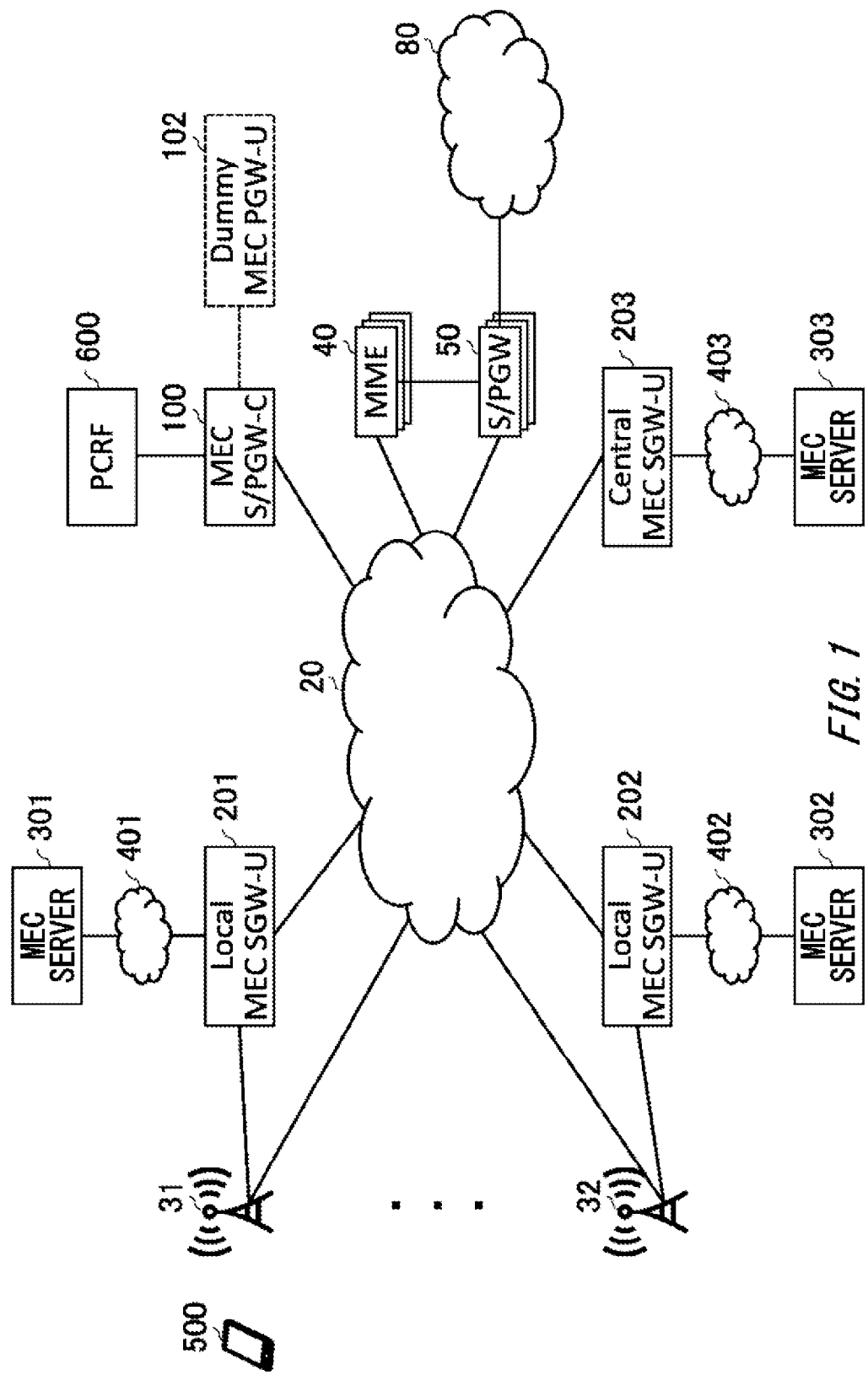
FIG. 1 schematically illustrates one example of a system 10.

FIG. 1 schematically illustrates one example of a system 10. The system 10 according to the present embodiment includes MEC S/PGW-C 100 and a plurality of MEC SGW-U 200, which are connected to a backhaul 20. The backhaul 20 may be a so-called backhaul in a mobile communication network.

The MEC S/PGW-C 100 may be one example of a control plane device. The MEC SGW-U 200 may be one example of a user plane device. In FIG. 1, as a plurality of the MEC SGW-U 200, a Local MEC SGW-U 201, a Local MEC SGW-U 202 and a Central MEC SGW-U 203 are exemplified.

The system 10 may include a PCRF 600. In FIG. 1, the PCRF 600 connected to the MEC S/PGW-C 100 is exemplified. The PCRF 600 may be one example of a policy control unit.

The system 10 may include a plurality of MEC servers 300 respectively connected to each of the plurality of MEC SGW-U 200. Also, the system 10 may include a plurality of networks 400 for connecting each of the plurality of MEC SGW-U 200 and each of the plurality of MEC servers 300. In FIG. 1, as a plurality of MEC servers 300, a MEC server 301, a MEC server 302 and a MEC server 303 are exemplified, and as a plurality of networks 400, a network 401, a network 402 and a network 403 are exemplified.

Also, the system 10 may include a plurality of eNB (evolved NodeB) 30, a plurality of MME (Mobility Management Entity) 40 and a plurality of S/PGW 50. The S/PGW 50 includes a SGW 51 and a PGW 52. The SGW 51 includes a SGW-C 54 and a SGW-U 56. The PGW 52 includes a PGW-C 55 and a PGW-U 57. In FIG. 1, as a plurality of eNB 30, an eNB 31 and an eNB 32 are exemplified. The system 10 according to the present embodiment is realized by arranging the MEC S/PGW-C 100, the plurality of MEC SGW-U 200, the plurality of MEC servers 300 and the plurality of networks 400 for an existing mobile communication system with the backhaul 20, the plurality of eNB 30, the plurality of MME 40 and the plurality of S/PGW 50, for example.

The Local MEC SGW-U 201 may be arranged in the vicinity of the eNB 31. The MEC server 301 may be arranged in the vicinity of the Local MEC SGW-U 201. The Local MEC SGW-U 202 may be arranged in the vicinity of the eNB 32. The MEC server 302 may be arranged in the vicinity of the Local MEC SGW-U 202. Being arranged in the vicinity may indicate being arranged within a predetermined physical distance, or may indicate being arranged within a predetermined communication distance, for example. The Central MEC SGW-U 203 may be arranged in a center station with the MME 40, the S/PGW 50 and so on arranged therein, for example.

A so-called concept "Always-ON" is employed in the existing mobile communication system, and when the power source of a UE 500, which is a user terminal, has been turned on, a connection request from the UE 500 is transmitted, an S/PGW 50 corresponding to the UE 500 is selected from a plurality of S/PGW 50 by the MME 40, and an IP address is assigned to the UE 500 by the PGW. Based on the protocol of the existing mobile communication system, the PGW associated with the UE 500 by the MME 40 will not be changed in principle while the power source of the UE500 is on. For example, the PGW will not be changed even when the UE 500 performs handover or temporarily becomes out of communication range. In order to change the PGW, a procedure such as temporarily cutting off and reconnecting the UE 500 is required, for example.

Also, based on the protocol of the existing mobile communication system, an IP address must be assigned to the UE 500. For example, in an EPC (Evolved Packet Core), one IPv4 address is assigned, one IPv6 address is assigned, or one IPv4 address and one IPv6 address are assigned to the UE 500. In the existing EPC, in order to change the IP address assigned to the UE 500, a procedure such as temporarily cutting off and reconnecting the UE 500 is required, for example.

Also, based on the protocol of the existing mobile communication system, for example, even if the UE 500 has a plurality of sessions, such as one for voice and one for data communication, there must be one SGW, and different SGWs cannot be assigned to each session.

Consequently, based on the protocol, in the existing mobile communication system, in order to change the exit from the mobile communication network to follow the movement of the UE 500, it is required to cut off and reconnect the UE 500, for example.

A possible method to realize the MEC in the existing mobile communication system is, for example, to arrange a MEC server or the like between the eNB30 and the SGW, to identify a packet, to extract the packet if it is a data for the MEC, and to transmit it to the SGW if it is not a data for the MEC. However, some contracts may prohibit the extraction of a packet. For example, although one telecommunications operator can extract a packet of the UE 500 that it manages, in some cases, it cannot extract a packet of the UE 500 managed by another telecommunications operator. Also, for example, in some cases, it is not possible to extract a packet of the UE 500 utilizing international roaming.

In the system 10 according to the present embodiment, a common address range is assigned to a plurality of networks 400. In the example illustrated in FIG. 1, a common address range is assigned to the network 401, the network 402 and the network 403.

The MME 40 according to the present embodiment assigns the SGW-C 54 and the PGW-C 55, or the MEC S/PGW-C 100 to the UE 500. For example, the MME 40 is configured to assign the MEC S/PGW-C 100 to the UE 500 when a predetermined condition has been satisfied, and is configured to select and assign the SGW-C 54 and the PGW-C 55 corresponding to the UE 500 when the condition has not been satisfied, similar to the existing MME 40. When the SGW-C 54 and the PGW-C 55 are assigned, the UE 500 is configured to communicate with an external network 80 of the mobile communication network via the S/PGW 50. The network 80 is, for example, the Internet or the like.

The predetermined condition may be, for example, that the connection request transmitted by the UE 500 includes an APN predetermined for MEC, that the IMSI (International Mobile Subscriber Identity) of the UE 500 is the IMSI predetermined for MEC, that the IMEI (International Mobile Equipment Identity) of the UE 500 is the IMEI predetermined for MEC and so on. The MME 40 is configured to assign the MEC S/PGW-C 100 to the UE 500 when, for example, the APN included in the connection request transmitted by the UE 500 is an APN predetermined for MEC. When the system 10 includes a plurality of MEC S/PGW-C100, the APN corresponding to each of the plurality of MEC S/PGW-C100 may be preconfigured, and the MME 40 may be configured to assign the MEC S/PGW-C100 corresponding to the APN included in the connection request to the UE 500.

Also, for example, when the IMSI of the UE 500 is an IMSI predetermined for MEC, the MME 40 is configured to assign the MEC S/PGW-C 100 to the UE 500. When the system 10 includes a plurality of MEC S/PGW-C100, the IMSI corresponding to each of the plurality of MEC S/PGW-C100 may be preconfigured, and the MME 40 may be configured to assign the MEC S/PGW-C100 corresponding to the IMSI of the UE 500 to the UE500. A different range of IMSI can be configured for each of the plurality of MEC S/PGW-C 100, for example.

Also, when the IMEI of the UE 500 is an IMEI predetermined for MEC, the MME 40 is configured to assign the MEC S/PGW-C 100 to the UE 500, for example. When the system 10 includes a plurality of MEC S/PGW-C100, the IMEI corresponding to each of the plurality of MEC S/PGW-C 100 may be preconfigured, and the MME 40 may be configured to assign the MEC S/PGW-C100 corresponding to the IMEI of the UE 500 to the UE500. A different range of IMEI can be configured for each of the plurality of MEC S/PGW-C 100, for example. Although the IMEI includes a model-specific number of the UE 500, a different MEC S/PGW-C100 may be associated with each model of the UE 500, for example.

Also, the MME 40 may be configured to, for example, assign the MEC S/PGW-C 100 to the UE 500 further based on at least any of the load and assignment status of at least any of the MEC S/PGW-C100 and the plurality of MEC SGW-U 200.

For example, when the MME 40 has determined to assign the MEC S/PGW-C100 to the UE 500 based on another condition and when the load on the MEC S/PGW-C100 is lower than a predetermined threshold value, the MME 40 is configured to assign the MEC S/PGW-C100 to the UE 500. Even when the MME 40 has determined to assign the MEC S/PGW-C100 to the UE 500 based on another condition, when the load on the MEC S/PGW-C 100 is higher than a predetermined threshold value, the MME 40 may be configured to select and assign the SGW-054 and PGW-055 corresponding to the UE 500 without assigning the MEC S/PGW-C 100.

Also, for example, when the MME 40 has determined to assign the MEC S/PGW-C100 to the UE 500 based on another condition and when the load of at least any of the plurality of MEC SGW-U 200 is lower than a predetermined threshold value, the MME 40 is configured to assign the MEC S/PGW-C100 to the UE 500. Even when the MME 40 has determined to assign the MEC S/PGW-C 100 to the UE 500 based on another condition, when the load on all of the plurality of MEC SGW-U200 is higher than a predetermined threshold value, the MME 40 may be configured to select and assign the SGW-054 and PGW-055 corresponding to the UE 500 without assigning the MEC S/PGW-C100.

Also, for example, when the MME 40 has determined to assign the MEC S/PGW-C100 to the UE 500 based on another condition and for at least any of the plurality of MEC SGW-U200, when the number of the assigned UE 500 is less than a predetermined number, the MME 40 is configured to assign the MEC S/PGW-C100 to the UE 500. Even when the MME 40 has determined to assign the MEC S/PGW-C100 to the UE 500 based on another condition, for all of the plurality of MEC SGW-U200, when the number of the assigned UE 500 is more than a predetermined number, the MME 40 may be configured to select and assign the SGW-U 054 and PGW-U 055 corresponding to the UE 500 without assigning the MEC S/PGW-C 100.

In the system 10 according to the present embodiment, the PGW-U is treated as a virtual entity for the MME 40 and the MEC S/PGW-C 100. Specifically, although the SGW-C, the SGW-U, the PGW-C and the PGW-U are respectively assigned with an IP address and a port, the PGW-U is configured not to be used. In the system 10 according to the present embodiment, the IP address and port of the PGW-U may be a dummy. Although the protocol of the mobile communication system requires the IP addresses and ports of the SGW-C, the SGW-U, the PGW-C, and the PGW-U to be configured, this requirement is satisfied by assigning the dummy IP addresses and ports.

In the example illustrated in FIG. 1, the Dummy MEC PGW-U 102 is virtually arranged with respective to the MEC S/PGW-C 100. In the MEC S/PGW-C 100, the dummy IP address and port are assigned as the IP address and port of the Dummy MEC PGW-U 102. The IP address of the dummy may be any value that satisfies a requirement as an IP address. The port of the dummy may be any value that satisfies a requirement as a port. A value that satisfies a requirement of the S5/S8 PGW-U Interface inside the Bearer Context is configured as the IP address and port of the Dummy MEC PGW-U 102.

When the MEC S/PGW-C 100 has received a session generating request from the MME 40, it is configured to select the MEC SGW-U 200 corresponding to the UE 500 from the plurality of MEC SGW-U 200.

The MEC S/PGW-C 100 is configured to select the MEC SGW-U 200 corresponding to the UE 500 based on serving area information including information of a serving area of the UE 500, for example. The MEC S/PGW-C 100 may also be configured to receive the serving area information of the UE 500 from the MME 40. The serving area information may include at least any of the TAC (Tracking Area Code), the identifier of the eNB 30, the name of the eNB 30 and the IP address of the eNB 30. It is possible for the MME 40 to obtain such information from the eNB according to the S1AP.

Also, for example, the MEC S/PGW-C 100 is configured to select the MEC SGW-U 200 corresponding to the UE 500 based on the APN configured for the UE 500. The MEC S/PGW-C 100 may be configured to select the MEC SGW-U 200 corresponding to the APN configured for the UE 500 among the plurality of MEC SGW-U 200.

Also, for example, the MEC S/PGW-C 100 is configured to select the MEC SGW-U 200 corresponding to the UE 500 based on the IMSI of the UE 500. The MEC S/PGW-C 100 may be configured to select the MEC SGW-U 200 corresponding to the IMSI of the UE 500 among the plurality of MEC SGW-U 200.

Also, for example, the MEC S/PGW-C 100 is configured to select the MEC SGW-U 200 corresponding to the UE 500 based on the IMEI of the UE 500. The MEC S/PGW-C 100 may be configured to select the MEC SGW-U 200 corresponding to the IMEI of the UE 500 among the plurality of MEC SGW-U 200.

Also, for example, the MEC S/PGW-C 100 is configured to select the MEC SGW-U 200 corresponding to the UE 500 based on at least any of the load condition and the assignment status of the plurality of MEC SGW-U 200. The MEC S/PGW-C 100, for example, is configured to select the MEC SGW-U 200, which has a load lower than another MEC SGW-U 200 among the plurality of MEC SGW-U 200, as the MEC SGW-U 200 corresponding to the UE 500. As a specific example, the MEC S/PGW-C 100 is configured to select the MEC SGW-U 200 with a lowest load among the plurality of MEC SGW-U 200. Also, for example, the MEC S/PGW-C 100 is configured to select the MEC SGW-U 200 with the number of the assigned UE 500 less than another MEC SGW-U 200 among the plurality of MEC SGW-U 200 as the MEC SGW-U 200 corresponding to the UE 500. As a specific example, the MEC S/PGW-C 100 is configured to select the MEC SGW-U 200 with the least number of the assigned UE 500 among the plurality of MEC SGW-U 200.

The MEC S/PGW-C 100 may also be configured to select the MEC SGW-U 200 corresponding to the UE 500 based on two or more of the serving area information of the UE 500, the APN which are configured in the UE 500, the IMSI of the UE 500, the IMEI of the UE 500, and the load condition and the assignment status of the plurality of MEC SGW-U 200.

The MEC S/PGW-C 100 may be configured to notify the PCRF 600 of the information for selecting the MEC SGW-U 200, such as the serving area information, and the PCRF 600 may be configured to select the MEC SGW-U 200 and to issue instructions to the MEC S/PGW-C 100. The MEC S/PGW-C 100 is, for example, configured to notify the PCRF 600 of the information including at least any of the serving area information of the UE 500, the APN which are configured in the UE 500, the IMSI of the UE 500, the IMEI of the UE 500, and the load condition and the assignment status of the plurality of MEC SGW-U 200.

In the example illustrated in FIG. 1, the MEC S/PGW-C 100 is configured to select the Local MEC SGW-U 201. The MEC S/PGW-C 100 is configured to notify the MME 40 and the eNB 31 of the information of the selected Local MEC SGW-U 201. Also, the MEC S/PGW-C 100 is configured to obtain the IP address to be assigned to the UE 500 from the address range common to the plurality of networks 400.

The MEC S/PGW-C 100 may be configured to select the IP address to be assigned to the UE 500 from the common address range for the plurality of networks 400. The system 10 may have a plurality of common address ranges assigned to the UE 500, and the MEC S/PGW-C 100 may also obtain the IP address to be assigned to the UE 500 from one common address range selected from a plurality of common address ranges. The MEC S/PGW-C 100 may be configured to select one common address range from the plurality of common address ranges, based on at least any of the APN configured for the UE 500, the IMSI of the UE 500, the IMEI of the UE 500, the load condition and the assignment status of the plurality of MEC SGW-U 200, and the assignment status of the common address range, for example.

Note that the selection of the IP address to be assigned to the UE 500 may also be performed by the PCRF 600. In this case, the MEC S/PGW-C 100 may also be configured to obtain the IP address to be assigned to the UE 500 from the PCRF 600.

Since the IP address assigned to the UE 500 is included in the common address range assigned to the network 401, the communication by the UE 500 can go out of the mobile communication network from the Local MEC SGW-U 201 and thereby become communicable with the MEC server 301. This enables the UE 500 to receive services by the MEC server 301.

In the example illustrated in FIG. 1, when the UE 500 has moved and performed handover to the eNB 32, the MEC S/PGW-C 100 is configured to select the Local MEC SGW-U 202. Then, the MEC S/PGW-C 100 is configured to notify the MME 40 and the eNB 32 of the information of the selected Local MEC SGW-U 202.

Since the IP address assigned to the UE 500 is included in the common address range assigned to the network 402, the communication by the UE 500 can go out of the mobile communication network from the Local MEC SGW-U202 and thereby can communicate with the MEC server 302. This enables the UE 500 to receive services by the MEC server 302.

In the system 10 according to the present embodiment, since the common address range is assigned to the plurality of networks 400 and the IP address is assigned to the UE 500 from the common address range, the UE 500 can communicate with the outside of the mobile communication network from any of the plurality of MEC SGW-U 200 without being assigned with the IP address again. In this way, when the UE 500, which receives services from the MEC server 300 in the vicinity of the eNB 30, moves and performs handover to another eNB 30, the UE 500 can be capable to continue to receive services from the MEC server 300 in the vicinity of another eNB 30 without being cut off and reconnected.

The network 401, the network 402, and the network 403 illustrated in FIG. 1 are assigned with a common address range and may be closed networks. Note that the network 401, the network 402 and the network 403 are not required to be closed networks. For example, if there is no routing problem, it is not required to make them closed.

For the common address range, routing related information such as the IP address of the DNS (Domain Name System), the network mask, and the default gateway and so on may also be common.

Figure 2:
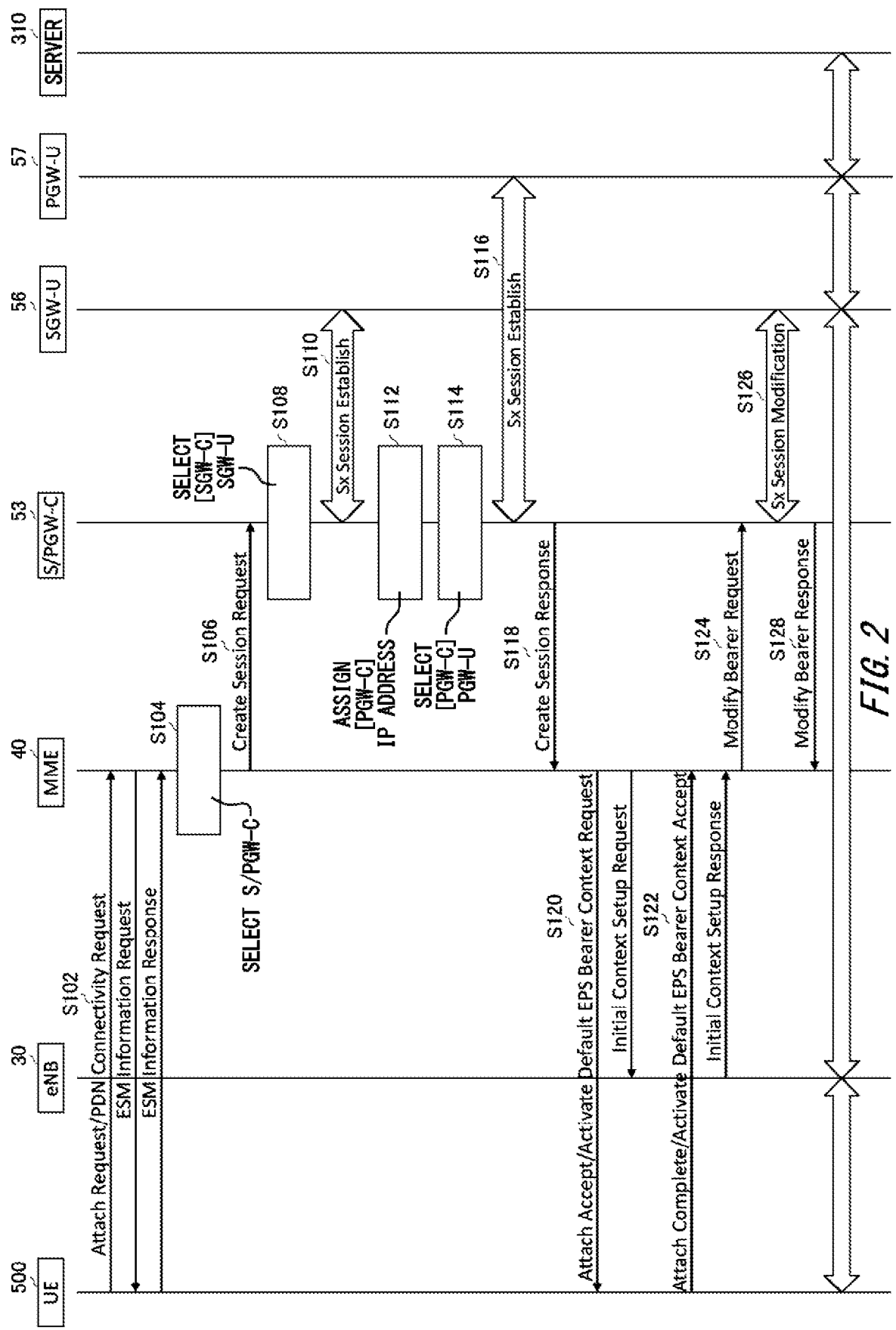
FIG. 2 schematically illustrates one example of a conventional flow of a connection process of a UE 500.

FIG. 2 schematically illustrates a conventional flow of a connection process of the UE 500. FIG. 2 describes a state in which the power of the UE 500 has been on as an initial state.

In step (in some cases, step is abbreviated to S) 102, the UE 500 is configured to transmit the "Attach Request/PDN Connectivity Request" to the MME 40 via the eNB 30. "Attach Request/PDN Connectivity Request" is one example of the connection request.

In S104, the MME 40 is configured to select the S/PGW-C 53 based on the "Attach Request/PDN Connectivity Request" received in S102, or the APN included in the "ESM Information Response", which is a following procedure to be performed. The S/PGW-C 53 includes a SGW-C 54 and a PGW-C 55.

In S106, the MME 40 is configured to transmit the "Create Session Request" to the S/PGW-C 53. "Create Session Request" may be one example of the session generating request. In "Create Session Request", terminal attribute information or the like including the serving area information indicating the terminal location, information of the terminal type and so on, is included. Also, at least any of the identifier of the eNB 30, the name of the eNB 30 and the IP address of the eNB 30 can be included therein.

In S108, the SGW-C 54 is configured to select the SGW-U 56 based on the information included in the "Create Session Request", which is received in S106. In S110, the SGW-C 54 is configured to establish sessions between the eNB 30 and the SGW-U 56, and between the SGW-U 56 and the server 310, as the sessions for UE 500, according to the Sx Session establishment procedure for the SGW-U 56 selected in S108. The Sx Session establishment procedure may be one example of the session establishment request.

In S112, the PGW-C 55 is configured to assign the IP address to the UE 500. In S114, the PGW-C 55 is configured to select the PGW-U 57. In S116, the PGW-C 55 is configured to establish a session with the PGW-U 57 selected in S114, according to the Sx Session establishment procedure.

In S118, the S/PGW-C 53 is configured to transmit the "Create Session Response" to the MME 40. "Create Session Response" may be one example of the session generating response. "Create Session Response" includes the identification information, the IP address and the port of the SGW-U 56 selected in S108, the IP address assigned to the UE 500 in S112, the identification information, the IP address and the port of the PGW-U 57 selected in S114.

In S120, the MME 40 is configured to transmit "Attach Accept/Activate Default EPS Bearer Context Request" to the UE 500 via the eNB 30. The MME 40 may be configured to notify the UE 500 of the IP address through "Attach Accept/Activate Default EPS Bearer Context Request". Also, the MME 40 may also be configured to notify the eNB 30 of the information of the MEC SGW-U 200 by "Initial Context Setup Request". "Attach Accept" may be an example of the connection response, and "Activate Default EPS Bearer Context Request" and "Initial Context Setup Request" may be an example of the connection instruction.

In S122, the UE 500 is configured to notify the MME 40 of the completion of connection by "Attach Complete/Activate Default EPS Bearer Context Accept". Also, "Initial Context Setup Response" includes the information about the connection of the eNB 30 while the eNB 30 responding to the connection instruction.

In S124, the MME 40 is configured to include the information about the connection of the eNB 30, which is included in "Initial Context Setup Response" received in S122, in "Modify Bearer Request", and to notify the S/PGW-C 53 of the information.

In S126, the S/PGW-C 53 is configured to notify the SGW-U 56 of the information about the connection of the eNB 30, which is included in "Modify Bearer Request" received in S124, according to the Sx Session modification procedure.

In S128, the S/PGW-C 53 is configured to notify the MME 40 that the information about the connection of the eNB 30 notified in S126 has been reflected in the SGW-U 56, by "Modify Bearer Response". According to the above-described flow, the connection of the UE 500 is completed, and the UE 500 and the server 310 can communicate with each other via the eNB 30, the SGW-U 56 and the PGW-U 57.

Figure 3:
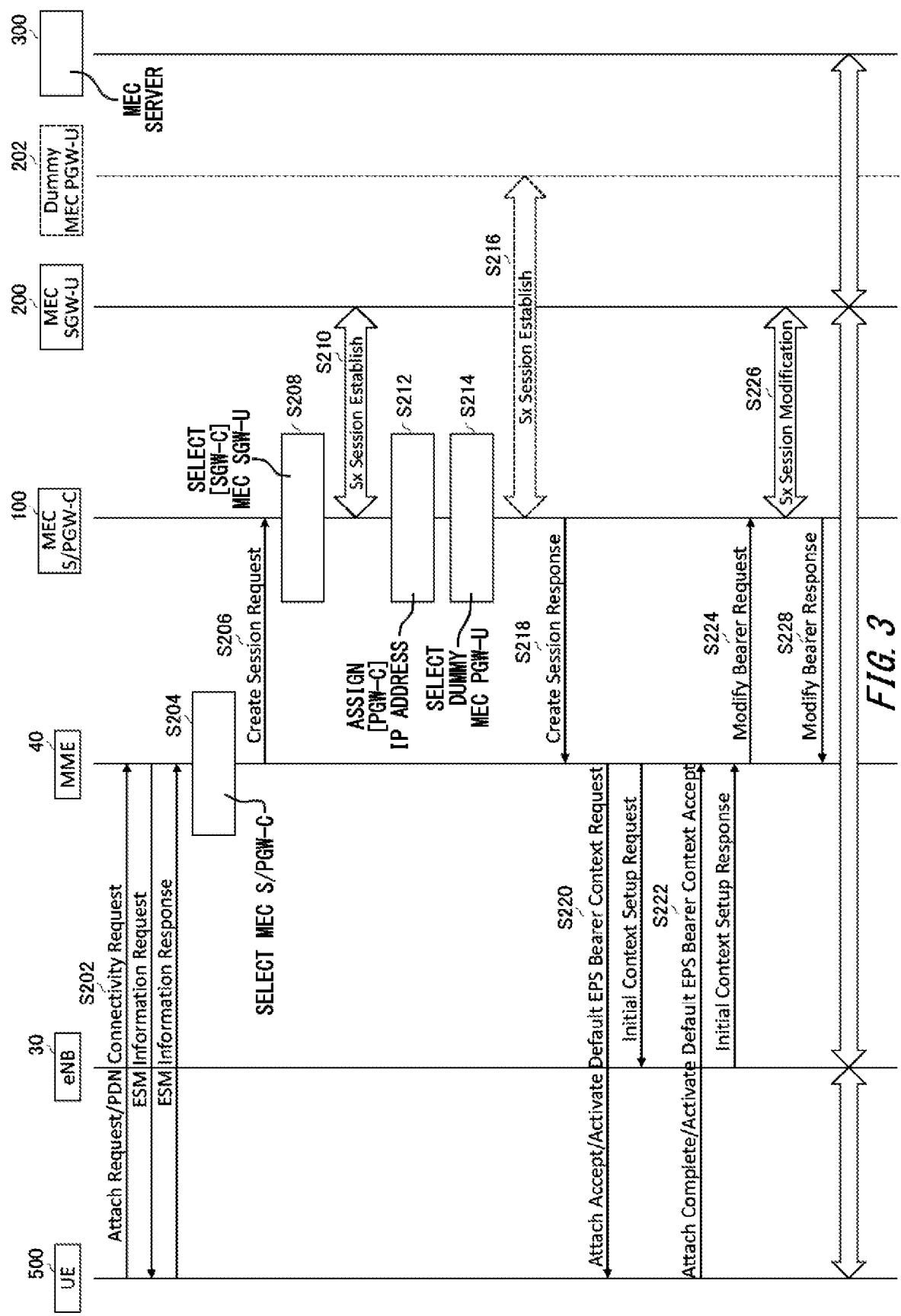
FIG. 3 schematically illustrates one example of a flow of a process in the system 10.

FIG. 3 schematically illustrates one example of a flow of a process in the system 10. Herein, the flow of a connection process of the UE 500 is schematically illustrated. FIG. 3 describes a state in which the power of the UE 500 has been on as an initial state.

In S202, the UE 500 is configured to transmit the "Attach Request/PDN Connectivity Request" to the MME 40 via the eNB 30. "Attach Request/PDN Connectivity Request" is one example of the connection request.

In S204, the MME 40 is configured to select the S/PGW-C 50 or the MEC S/PGW-C 100 based on the "Attach Request/PDN Connectivity Request" received in S202, or the APN included in the "ESM Information Response", which is a following procedure to be performed. Herein, the case where an APN predetermined for MEC is included in the APN is exemplified. The MME 40 is configured to select the MEC S/PGW-C 100.

In S206, the MME 40 is configured to transmit the "Create Session Request" to the MEC S/PGW-C 100. "Create Session Request" may be one example of the session generating request. In "Create Session Request", terminal attribute information or the like including the serving area information indicating terminal location, information of the terminal type and so on, is included. Also, at least any of the identifier of the eNB 30, the name of the eNB 30 and the IP address of the eNB 30 can be included therein.

In S208, the SGW-C of the MEC S/PGW-C 100 is configured to select the MEC SGW-U 200 based on the information included in "Create Session Request" received in S206. The MEC S/PGW-C 100 is configured to select the MEC SGW-U 200 arranged in the vicinity of the eNB 30 with reference to the serving area information included in "Create Session Request", for example. Note that the SGW-C of the MEC S/PGW-C 100 may be configured to select the Local MEC SGW-U when the Local MEC SGW-U is arranged in the vicinity of the eNB 30, and may be configured to select the Central MEC SGW-U when the Local MEC SGW-U is not arranged in the vicinity of the eNB 30. Also, the SGW-C of the MEC S/PGW-C 100 may also be configured to select the MEC SGW-U 200 according to the IMSI range, the IMEI range, and the load condition and the assignment status and so on of the plurality of MEC SGW-U 200.

The selection of the MEC SGW-U 200 may be performed by the PCRF600. For example, the MEC S/PGW-C 100 is configured to notify the PCRF 600 of the information included in "Create Session Request", and the PCRF 600 is configured to select the MEC SGW-U 200 and instruct the MEC S/PGW-C 100.

In S210, the MEC S/PGW-C 100 is configured to establish sessions of the eNB 30 and the MEC S/PGW-U 200, and the S/PGW-U 200 and the MEC server 300, as the sessions for UE 500, according to the Sx Session establishment procedure for the MEC SGW-U 200 selected in S208. The Sx Session establishment procedure may be one example of the session establishment request.

In S212, the PGW-C of the MEC S/PGW-C 100 is configured to assign the IP address to the UE 500. The PGW-C of the MEC S/PGW-C 100 may be configured to select the IP address to be assigned to the UE 500 from the common address range for the plurality of networks 400. Note that in pre-subscriber data, the IP address may be associated with the UE 500, and the PGW-C of the MEC S/PGW-C 100 may be configured to select the IP address by referring to the association. Also, the MEC S/PGW-C 100 may have a plurality of common address ranges to assign to the UE 500 and be configured to select a common address range from the APN configured for the UE 500, the IMSI range, the IMEI range, the load or the assignment status of the S/PGW-C or the S/PGW-U. The assignment of the IP address may be selected by the PCRF 600 and instructed to the MEC S/PGW-C 100 in S208.

In S214, the PGW-C of the MEC S/PGW-C 100 is configured to select the Dummy MEC PGW-U 102. In S216, the MEC S/PGW-C 100 is configured to establish a session with the Dummy MEC PGW-U 102 according to the Sx Session establishment procedure. Note that the MEC S/PGW-C 100 may not establish a session with the Dummy MEC PGW-U 102. That is, S216 may be omitted.

In S218, the MEC S/PGW-C 100 is configured to transmit "Create Session Response" to the MME 40. "Create Session Response" may be one example of the session generating response. "Create Session Response" includes the IP address assigned to the UE 500 in S110. Also, "Create Session Response" includes the information of the MEC SGW-U 200 selected in S208. The information of the MEC SGW-U 200 may include the identification information, the IP address and the port of the MEC SGW-U 200. Also, "Create Session Response" includes the information of the Dummy MEC PGW-U 102. The information of the Dummy MEC PGW-U 102 may include the identification information, the IP address and port of the Dummy MEC PGW-U 102. The IP address and port of the Dummy MEC PGW-U 102 may be a dummy. If "Create Session Response" does not include the IP address and port of the PGW-U, it does not comply with the 3GPP standard, and an error occurs in the MME40, and the connection process of the UE500 cannot be completed. In contrast, in the system 10 according to the present embodiment, the dummy IP address and port are assigned to the Dummy MEC PGW-U102 and the IP address and port of the Dummy MEC PGW-U102 can be included in the "Create Session Response", thus the process can be performed in compliance with the 3GPP standard.

In S220, the MME 40 is configured to transmit "Attach Accept/Activate Default EPS Bearer Context Request" to the UE 500 via the eNB 30. The MME 40 may be configured to notify the UE 500 of the IP address by "Attach Accept/Activate Default EPS Bearer Context Request". Also, the MME 40 may also be configured to notify the eNB 30 of the information of the MEC SGW-U 200 by "Initial Context Setup Request". "Attach Accept" may be an example of the connection response, and "Activate Default EPS Bearer Context Request" and "Initial Context Setup Request" may be an example of the connection instruction.

In S222, the UE 500 is configured to notify the MME 40 of the completion of connection by "Attach Complete/Activate Default EPS Bearer Context Accept". Also, the eNB 30 is configured to include the information about the connection of the eNB 30 while responding to the connection instruction by "Initial Context Setup Response".

In S224, the MME 40 is configured to include the information about the connection of the eNB 30, which is included in "Initial Context Setup Response" received in S118, in "Modify Bearer Request", and to notify the MEC S/PGW-C 100 of the information.

In S226, the MEC S/PGW-C 100 is configured to notify the MEC SGW-U 200 of the information about the connection of the eNB 30, which is included in "Modify Bearer Request" received in S120, according to the Sx Session modification procedure.

In S228, the MEC S/PGW-C 100 is configured to notify the MME 40 that the information about the connection of the eNB 30 notified in S224 has been reflected in the MEC SGW-U 200, by "Modify Bearer Response". According to the above-described flow, the connection of the UE 500 is completed. The MEC SGW-U 200 is configured to relay the communication between the UE 500 and the MEC server 300 without going through the PGW-U when relaying the communication between UE500 and the MEC server 300, in the connection established according to the above-described flow. The UE 500 and the MEC server 300 are communicable via the eNB 30 and the MEC S/PGW-U 200.

As described above, according to the system 10 of the present embodiment, when the UE 500 communicates with the MEC server 300, the MEC SGW-U 200 can relay the communication between the UE 500 and the MEC server 300 without going through the PGW-U. In the conventional mechanism, as illustrated in FIG. 2, when the UE 500 communicates with some server, in principle, it communicates via the SGW-U and the PGW-U. On the other hand, according to the system 10 of the present embodiment, by virtually arranging the Dummy MEC PGW-U 102 and assigning the dummy IP address and port to the Dummy MEC PGW-U 102, it is possible to realize the relay of communication between the UE 500 and MEC server 300 by the MEC SGW-U 200 without going through the PGW-U while complying with the 3GPP standard.

Figure 4:
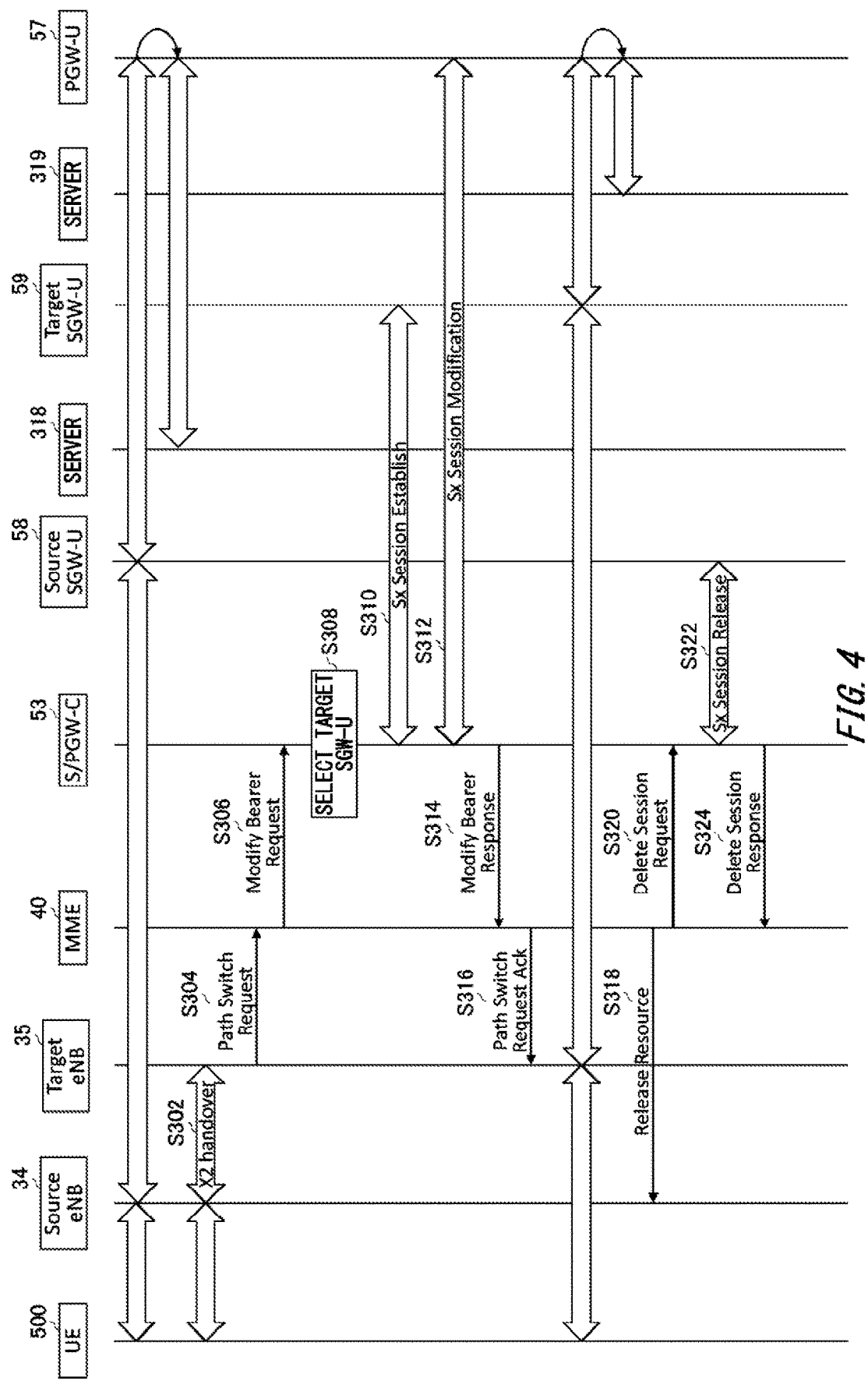
FIG. 4 schematically illustrates a conventional flow of an X2 handover process with respect to the UE 500.

FIG. 4 schematically illustrates a conventional flow of an X2 handover process with respect to the UE 500. Herein, according to the process illustrated in FIG. 2, a flow of a process in a case is described, in which the Source SGW-U 58 is assigned to the UE 500, and the UE 500 is configured to set the state of being communicating with the server 318 via the Source eNB 34, the Source SGW-U 58 and the PGW-U 57 as an initial state, and to perform handover from the Source eNB 34 to the Target eNB 35.

In S302, the X2 handover process is performed between the Source eNB 34 and the Target eNB 35. The Source eNB 34 is configured to transmit the handover request to the Target eNB 35. Such a handover request includes the information of the MME 40.

In S304, the Target eNB 35, which has been obtained by the handover request, is configured to transmit "Path Switch Request" including the information about the connection of the eNB 35 to the MME 40. In S306, the MME 40 is configured to transmit "Modify Bearer Request" including the information about the connection of the eNB 35 and the serving area information of the UE 500 to the S/PGW-C 53. "Path Switch Request" and "Modify Bearer Request" are examples of the handover request.

In S308, with reference to the serving area information of the UE 500, the S/PGW-C 53 is configured to select the Target SGW-U 59, which is deployed in the vicinity of the Target eNB 35.

In S310, the S/PGW-C 53 is configured to notify the Target SGW-U 59 selected in S308 of the information about the connection of the eNB 35 according to the Sx Session establishment procedure, and to request the establishment of the sessions between the eNB 35 and Target SGW-U 59, and between the Target SGW-U 59 and the server 319, as the sessions for the UE 500. In S312, the S/PGW-C 53 is configured to change the session of the PGW-U 57 according to the Sx Session modification procedure.

In S314, the S/PGW-C 53 is configured to transmit "Modify Bearer Response" including the connection information of the Target SGW-U 59 to the MME 40. In S316, the MME 40 is configured to transmit "Path Switch Request Ack" including the connection information of the Target SGW-U 59 to the Target eNB 35.

By the above-described flow, the handover of the UE 500 is completed, and the UE 500 and the server 319 become communicable via the Target SGW-U 59 and the PGW-U 57 arranged in the vicinity of the Target eNB 35, which is the handover destination.

In S318, the MME 40 is configured to transmit "Release Resource" to the Source eNB 34. The Source eNB 34 is configured to release the resource in response to the reception of "Release Resource".

In S320, the MME 40 is configured to transmit "Delete Session Request" to the S/PGW-C 53. In S322, the sessions of the Source eNB 34 and the Source SGW-U 58, and the Source SGW-U 58 and the server 318 are released. In S324, the S/PGW-C 53 is configured to transmit "Delete Session Response" to the MME 40.

Figure 5:
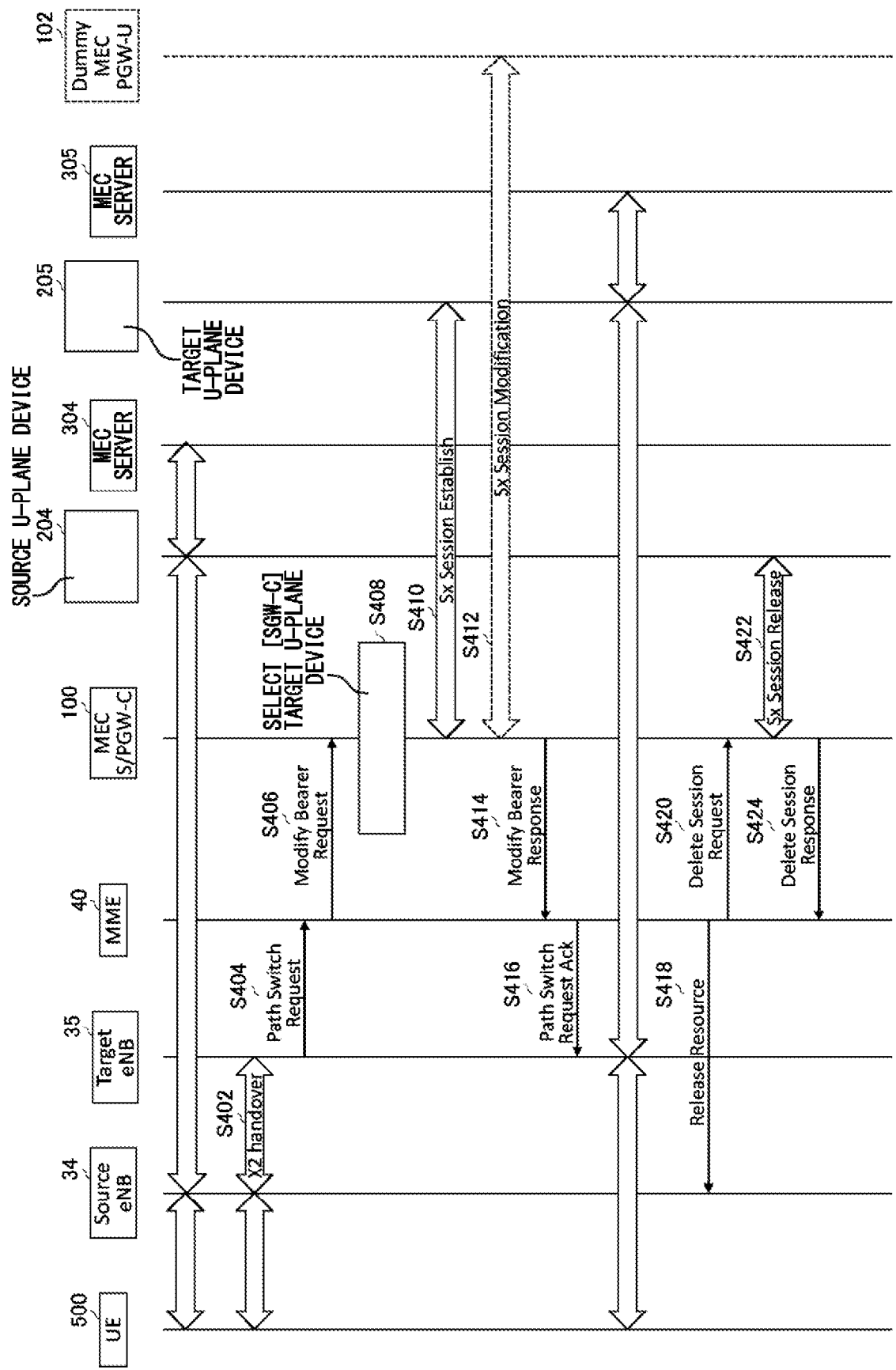
FIG. 5 schematically illustrates one example of a flow of a process in the system 10.

FIG. 5 schematically illustrates one example of a flow of a process in the system 10. FIG. 5 schematically illustrates a flow of the X2 handover process with respect to the UE 500. Herein, according to the process illustrated in FIG. 3, a flow of a process in a case is described, in which the Source U-plane device 204 is assigned to the UE 500, and the UE 500 is configured to set the state of being communicating with the MEC server 304 via the Source eNB 34 and the Source U-plane device 204 as an initial state, and to perform handover from the Source eNB 34 to the Target eNB 35.

Note that the Source U-plane device 204 may be the MEC SGW-U 200 where the UE 500 is serving. The Source U-plane device 204 may also include a PGW-U. Also, the Target U-plane device 205 may be a MEC SGW-U 200 arranged in the vicinity of the Target eNB 35, which is the handover destination of the UE 500. The Target U-plane device 205 may also include a PGW-U.

In S402, the X2 handover process is performed between the Source eNB 34 and the Target eNB 35. The Source eNB 34 is configured to transmit the handover request to the Target eNB 35. Such a handover request includes the information of the MME 40.

In S404, the Target eNB 35 is configured to transmit "Path Switch Request" including the information about the connection of the eNB 35 with respect to the MME 40, which has been obtained by the handover request. In S406, the MME 40 is configured to transmit "Modify Bearer Request" including the information about the connection of the eNB 35 with respect to the MEC S/PGW-C 100 and the serving area information of the UE 500. "Path Switch Request" and "Modify Bearer Request" are examples of the handover request.

In S408, with reference to the serving area information of the UE 500, the SGW-C of the MEC S/PGW-C 100 is configured to select the Target U-plane device 205, which is deployed in the vicinity of the Target eNB 35. The selection of the MEC SGW-U 200 may be performed by the PCRF 600. For example, the SGW-C of the MEC S/PGW-C 100 is configured to notify the PCRF 600 of the information included in "Modify Bearer Request", and the PCRF 600 is configured to select the MEC SGW-U 200 and instruct the SGW-C of the MEC S/PGW-C 100.

In S410, the MEC S/PGW-C 100 is configured to notify the Target U-plane device 205 selected in S408 of the information about the connection of the eNB 35 according to the Sx Session establishment procedure, and to request the establishment of the sessions of the eNB 35 and the Target U-plane device 205, and the Target U-plane device 205 and the MEC server 305, as the sessions for the UE 500. In S412, the MEC S/PGW-C 100 and the Dummy MEC PGW-U 102 are configured to change the session according to the Sx Session modification procedure. S412 may be omitted.

In S414, the MEC S/PGW-C 100 is configured to transmit "Modify Bearer Response" including the connection information of the Target U-plane device 205 to the MME 40. In S416, the MME 40 is configured to transmit "Path Switch Request Ack" including the connection information of the Target U-plane device 205 to the Target eNB 35.

By the above-described flow, the handover of the UE 500 is completed, and the UE 500 and the MEC server 305 become communicable via the network 400 corresponding to the Target U-plane device 205 arranged in the vicinity of the Target eNB 35, which is the handover destination, and the Target U-plane device 205. This enables the UE 500 to receive the services from the MEC server 305 following the services from the MEC server 304 without being cut off and reconnected.

In S418, the MME 40 is configured to transmit "Release Resource" to the Source eNB 34. The Source eNB 34 is configured to release the resource in response to the reception of "Release Resource".

In S420, the MME 40 is configured to transmit "Delete Session Request" to the MEC S/PGW-C 100. In S422, the sessions of the Source eNB 34 and the Source U-plane device 204, and the Source U-plane device 204 and the MEC server 304 are released. In S424, the MEC S/PGW-C 100 is configured to transmit "Delete Session Response" to the MME 40.

Figure 6:
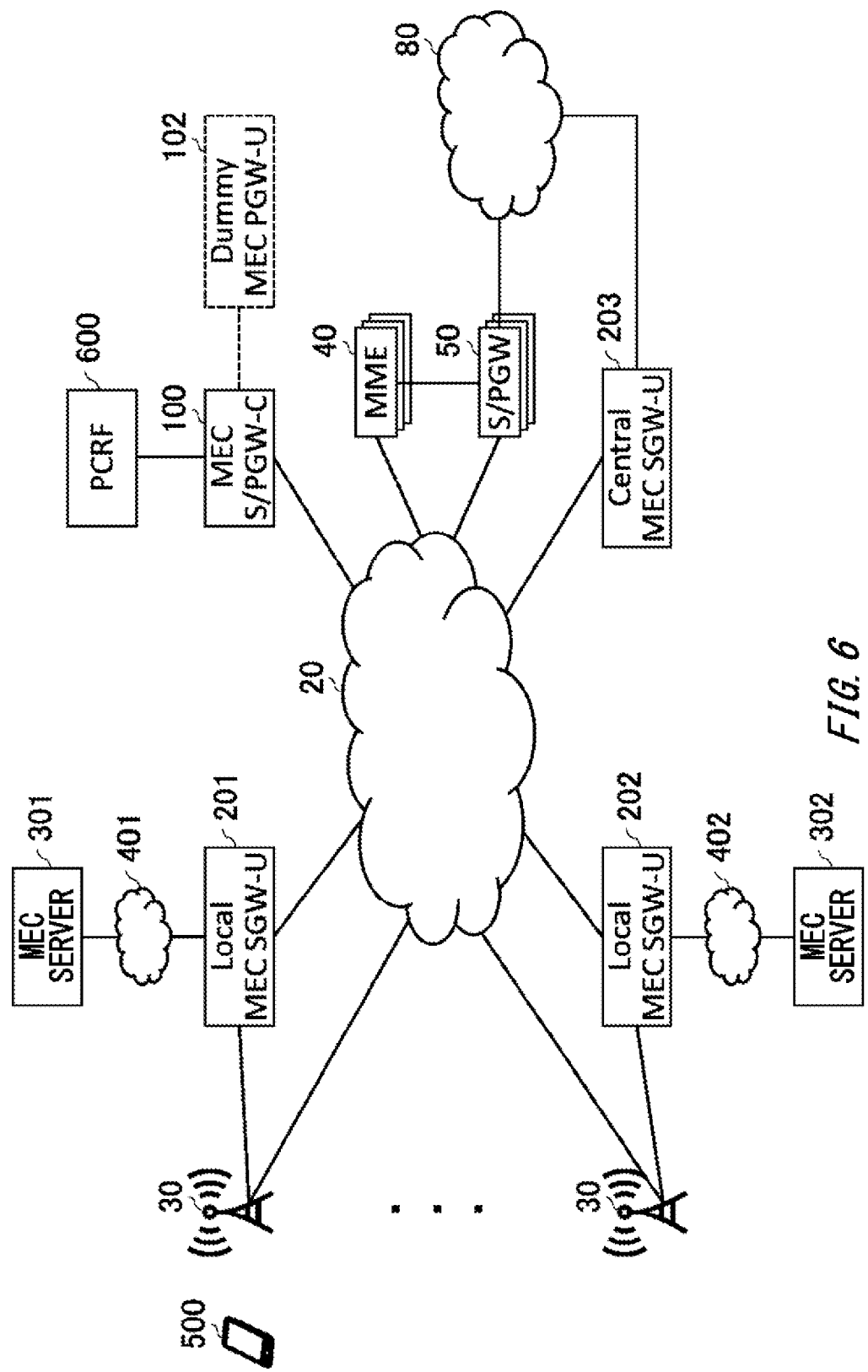
FIG. 6 schematically illustrates one example of the system 10.

FIG. 6 schematically illustrates one example of the system 10. Herein, the different points from the system 10 illustrated in FIG. 1 are mainly described. In the system 10 illustrated in FIG. 6, the network 401 and the network 402 are closed networks, and the Central MEC SGW-U 203 is connected to the network 80.

In the system 10 illustrated in FIG. 6, the MME 40 may be configured to select the S/PGW 50 for the UE 500 that does not utilize the MEC. Also, the MME 40 may be configured to select the MEC S/PGW-C 100 with respective to the UE 500 that does not utilize the MEC, and the MEC S/PGW-C 100 may be configured to select the Central MEC SGW-U 203 with respective to the UE 500. In the system 10 illustrated in FIG. 6, since the Central MEC SGW-U 203 is connected to the network 80, the UE 500 can communicate with the network 80 via the Central MEC SGW-U 203.

Figure 7:
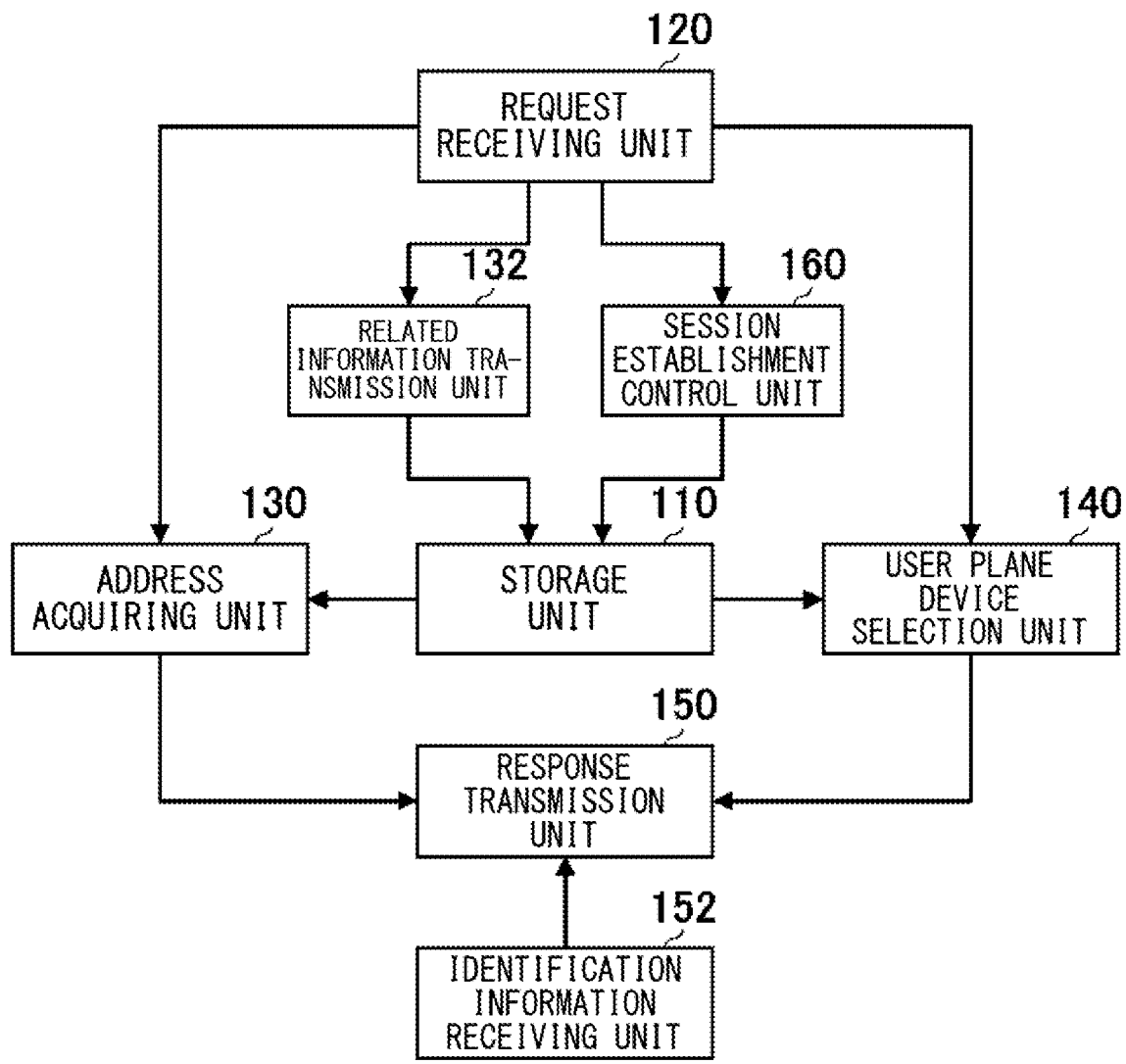
FIG. 7 schematically illustrates one example of a functional configuration of MEC S/PGW-C (Serving Gateway/PDN (Packet Data Network) Gatway-Control) 100.

FIG. 7 schematically illustrates one example of a functional configuration of the MEC S/PGW-C 100. The MEC S/PGW-C 100 includes a storage unit 110, a request receiving unit 120, an address acquiring unit 130, a related information transmission unit 132, a user plane device selection unit 140, a response transmission unit 150, an identification information receiving unit 152 and a session establishment control unit 160. Note that the MEC S/PGW-C 100 is not necessarily limited to include all of these configurations.

The storage unit 110 is configured to store various types of information. The storage unit 110 is configured to store information of the common address range that is common to the plurality of networks 400. The storage unit 110 may also be configured to store the information of the plurality of common address ranges. The storage unit 110 is configured to store the information of the APN predetermined for MEC. The storage unit 110 is configured to store the information of the MEC SGW-U 200 corresponding to each of the plurality of eNB 30. The MEC S/PGW-C 100 is configured to store the information of the MEC server 300 corresponding to each of the plurality of MEC SGW-U 200.

The storage unit 110 may be configured to store the information of the IMSI predetermined for MEC. The storage unit 110 may be configured to store the information of the range of the IMSI predetermined for MEC. The storage unit 110 may be configured to store the information of the IMEI predetermined for MEC. The storage unit 110 may be configured to store the information of the range of the IMEI predetermined for MEC.

The storage unit 110 may be configured to store the serving area information of the user terminal. The storage unit 110 may be configured to store the information about the load of the MEC S/PGW-C 100. Also, the storage unit 110 may be configured to store the information about the load of each of the plurality of MEC SGW-U 200. Also, the storage unit 110 may be configured to store the information about the assignment status of the UE 500 for each of the plurality of MEC SGW-U 200.

The request receiving unit 120 is configured to receive the session generating request transmitted by the mobility management device that has received the connection request from the user terminal, for example. The request receiving unit 120 is configured to receive the session generating request transmitted from the mobility management device, which has received the connection request from the user terminal, in response to a predetermined condition being satisfied, for example. The predetermined condition may include the APN with the connection request predetermined for MEC. Also, the predetermined condition may be that the user terminal IMSI is the IMSI predetermined for MEC. Also, the predetermined condition may be the fact that the user terminal IMEI is the IMEI predetermined for MEC.

Also, the request receiving unit 120 is configured to receive the session generating request transmitted from the mobility management device that has received the connection request from the user terminal, based on at least any of the load condition and the assignment status of at least any of the control plane device and the plurality of user plane devices, for example.

The address acquiring unit 130 is configured to obtain the IP address to be assigned to the user terminal from the common address range that is common to each of the plurality of networks corresponding to each of the plurality of user plane device, based on the session generating request received by the request receiving unit 120. The address acquiring unit 130 is configured to read the common address range that is common to the plurality of networks 400 each corresponding to each of the plurality of MEC SGW-U 200 from the storage unit 110, and to select the IP address to be assigned to the user terminal from the common address range, for example.

The address acquiring unit 130 may be configured to obtain the IP address to be assigned to the user terminal from one common address range selected from the plurality of common address ranges. The address acquiring unit 130 is configured to select one common address range from the plurality of common address ranges based on the APN configured for the user terminal, for example. For example, the APN may be configured to be associated with each of the plurality of common address ranges in advance, and the address acquiring unit 130 is configured to select the common address range corresponding to the APN configured for the user terminal from the plurality of common address ranges.

Also, the address acquiring unit 130 is configured to select one common address range from the plurality of common address ranges based on the user terminal IMSI, for example. For example, the IMSI may be configured to be associated with each of the plurality of common address ranges in advance, and the address acquiring unit 130 is configured to select the common address range corresponding to the user terminal IMSI from the plurality of common address ranges.

Also, the address acquiring unit 130 is configured to select one common address range from the plurality of common address ranges based on the user terminal IMEI, for example. For example, the IMEI may be configured to be associated with each of the plurality of common address ranges in advance, and the address acquiring unit 130 is configured to select the common address range corresponding to the user terminal IMEI from the plurality of common address ranges.

Also, the address acquiring unit 130 is configured to select one common address range from the plurality of common address ranges based on the load condition and the assignment status of the plurality of MEC SGW-U 200, for example. For example, the address acquiring unit 130 is configured to select one common address range from the plurality of common address ranges such that the loads of the plurality of MEC SGW-U 200 are distributed. Also, for example, the address acquiring unit 130 is configured to select one common address range from the plurality of common address range such that the assignment of the user terminal with respect to each of the plurality of MEC SGW-U 200 is balanced.

Also, the address acquiring unit 130 is configured to select one common address range from the plurality of common address ranges based on the assignment status of the plurality of the common address ranges, for example. For example, the address acquiring unit 130 is configured to select the common address range with a number of assignments less than another common address range among the plurality of common address ranges. As a specific example, the address acquiring unit 130 is configured to select the common address range with the least number of assignments among the plurality of common address ranges.

The address acquiring unit 130 may also be configured to select one common address range from the plurality of common address range, based on two or more of the APN configured for the user terminal, the user terminal IMSI, the user terminal IMEI, the load condition and the assignment status of the plurality of MEC SGW-U 200, and the assignment status of the common address range.

The related information transmission unit 132 may be configured to transmit the information used for selecting the IP address to be assigned to the user terminal by the PCRF 600 to the PCRF 600. Also, the related information transmission unit 132 may be configured to transmit the information used by the PCRF 600 for selecting the user plane device corresponding to the user terminal from the plurality of user plane devices to the PCRF 600. The PCRF 600 may be one example of the external device.

The related information transmission unit 132 may be configured to transmit the related information that is related to the user terminal to the PCRF 600. The related information that is related to the user terminal may include at least any of the serving area information of the user terminal, the APN configured for the user terminal, the user terminal IMSI, and the user terminal IMEI. Also, the related information transmission unit 132 may be configured to transmit the information about the load of the MEC S/PGW-C 100 to the PCRF 600. Also, the related information transmission unit 132 may be configured to transmit the information about the load of each of the plurality of MEC SGW-U 200 to the PCRF 600. Also, the related information transmission unit 132 may be configured to transmit the information about the assignment status of the UE 500 for each of the plurality of MEC SGW-U 200 to the PCRF 600.

The address acquiring unit 130 may be configured to receive, from the PCRF 600, the IP address, which is selected from the common address range as the IP address to be assigned to the user terminal by the PCRF 600, based on the information received from the related information transmission unit 132.

The user plane device selection unit 140 is configured to select the user plane device corresponding to the user terminal from the plurality of user plane devices. The user plane device selection unit 140 is configured to select the MEC SGW-U 200 corresponding to the user terminal from the plurality of MEC SGW-U 200, based on the serving area information of the user terminal included in the session generating request, for example. The user plane device selection unit 140 is configured to identify the MEC SGW-U 200 corresponding to the eNB 30 serving the user terminal and to select the MEC SGW-U 200, by taking reference to the information of the MEC SGW-U 200 corresponding to each of the plurality of eNB 30 stored in the storage unit 110, for example.

Also, the user plane device selection unit 140 is configured to select the MEC SGW-U 200 corresponding to the user terminal from the plurality of MEC SGW-U 200, based on the APN configured for the user terminal, for example. For example, the user plane device selection unit 140 is configured to select the MEC SGW-U 200 corresponding to the APN configured for the user terminal among the plurality of MEC SGW-U 200.

Also, the user plane device selection unit 140 is configured to select the MEC SGW-U 200 corresponding to the user terminal from the plurality of MEC SGW-U 200, based on the user terminal IMSI, for example. For example, the user plane device selection unit 140 is configured to select the MEC SGW-U 200 corresponding to the user terminal IMSI among the plurality of MEC SGW-U 200.

Also, the user plane device selection unit 140 is configured to select the MEC SGW-U 200 corresponding to the user terminal from the plurality of MEC SGW-U 200, based on the user terminal IMEI, for example. For example, the user plane device selection unit 140 is configured to select the MEC SGW-U 200 corresponding to the user terminal IMEI among the plurality of MEC SGW-U 200.

Also, the user plane device selection unit 140 is configured to select the MEC SGW-U 200 corresponding to the user terminal from the plurality of MEC SGW-U 200, based on the load condition of the plurality of MEC SGW-U 200, for example. For example, the user plane device selection unit 140 is configured to select the MEC SGW-U 200 with a lower load than another MEC SGW-U 200 among the plurality of MEC SGW-U 200. As a specific example, the user plane device selection unit 140 is configured to select the MEC SGW-U 200 with the lowest load among the plurality of MEC SGW-U 200.

The response transmission unit 150 is configured to transmit the session generating response corresponding to the session generating request received by the request receiving unit 120 to the mobility management device. The response transmission unit 150 may be configured to transmit the session generating response including the IP address obtained by the address acquiring unit 130 to the mobility management device. Also, the response transmission unit 150 may be configured to transmit the identification information for identifying the user plane device selected by the user plane device selection unit 140 to the mobility management device. The response transmission unit 150 may be configured to transmit the session generating response including the IP address obtained by the address acquiring unit 130 and the identification information for identifying the user plane device selected by the user plane device selection unit 140, to the mobility management device.

The response transmission unit 150 may be configured to transmit the session generating response including the IP address obtained by the address acquiring unit 130, the identification information, the IP address and port of the user plane device selected by the user plane device selection unit 140, and the identification information, the IP address and port of the Dummy MEC PGW-U 102, to the mobility management device. The Dummy MEC PGW-U 102 may be one example of the dummy PGW-U. The response transmission unit 150 may be configured to transmit the session generating response including the IP address and port of the dummy PGW-U, which satisfies the requirement of the S5/S8 PGW-U Interface inside the Bearer Context, to the mobility management device.

The identification information receiving unit 152 is configured to receive the identification information for identifying the user plane device selected from the plurality of user plane devices as the user plane device corresponding to the user terminal based on the information received from the related information transmission unit 132 by the PCRF 600, and the IP address and port of the user plane device, from the PCRF 600. The response transmission unit 150 may be configured to transmit the identification information for identifying the user plane device received by the identification information receiving unit 152 to the mobility management device. The response transmission unit 150 may be configured to transmit the session generating response including the IP address obtained by the address acquiring unit 130, the identification information, the IP address and port received by the identification information receiving unit 152, and the identification information, the IP address and port of the Dummy MEC PGW-U 102, to the mobility management device.

The session establishment control unit 160 is configured to control the request receiving unit 120 so as to establish a session corresponding to a first session generation request and a second session generation request, when the first session generation request for requesting the generation of the session for MEC of the user terminal and the second session generation request for requesting the generation of the session that is not for MEC of the user terminal are received from the MME 40, respectively. The session establishment control unit 160 may be configured to control to establish a session of the user plane device selected from the plurality of user plane devices for MEC and the wireless base station with the serving user terminal, as the session for MEC of the user terminal, based on the first session generation request. Also, the session establishment control unit 160 may be configured to control to establish a session of the PGW-U that is not for MEC and the wireless base station with the serving user terminal, as the session that is not for MEC of the user terminal, based on the second session generation request.

The session establishment control unit 160 may be configured to establish a session with the user plane device selected by the user plane device selection unit 140 when the first generation request has been received from the MME 40 by the request receiving unit 120. The session establishment control unit 160 may be configured to control to establish a session of the selected user plane device and the wireless base station with the serving user terminal, as the session for MEC of the user terminal. Also, the session establishment control unit 160 may be configured to establish a session with the Dummy MEC PGW-U 102 when the first generation request has been received from the MME 40 by the request receiving unit 120.

The session establishment control unit 160 may not establish a session with the Dummy MEC PGW-U 102 in between, when the first generation request has been received from the MME 40 by the request receiving unit 120. In this case, the session establishment control unit 160 may not establish a session with any of the PGW-U.

The PCRF 600 may be configured to have some or all of the functions of the storage unit 110, the address acquiring unit 130 and the user plane device selection unit 140, and operate according to the instruction from the MEC S/PGW-C 100.

Figure 8:
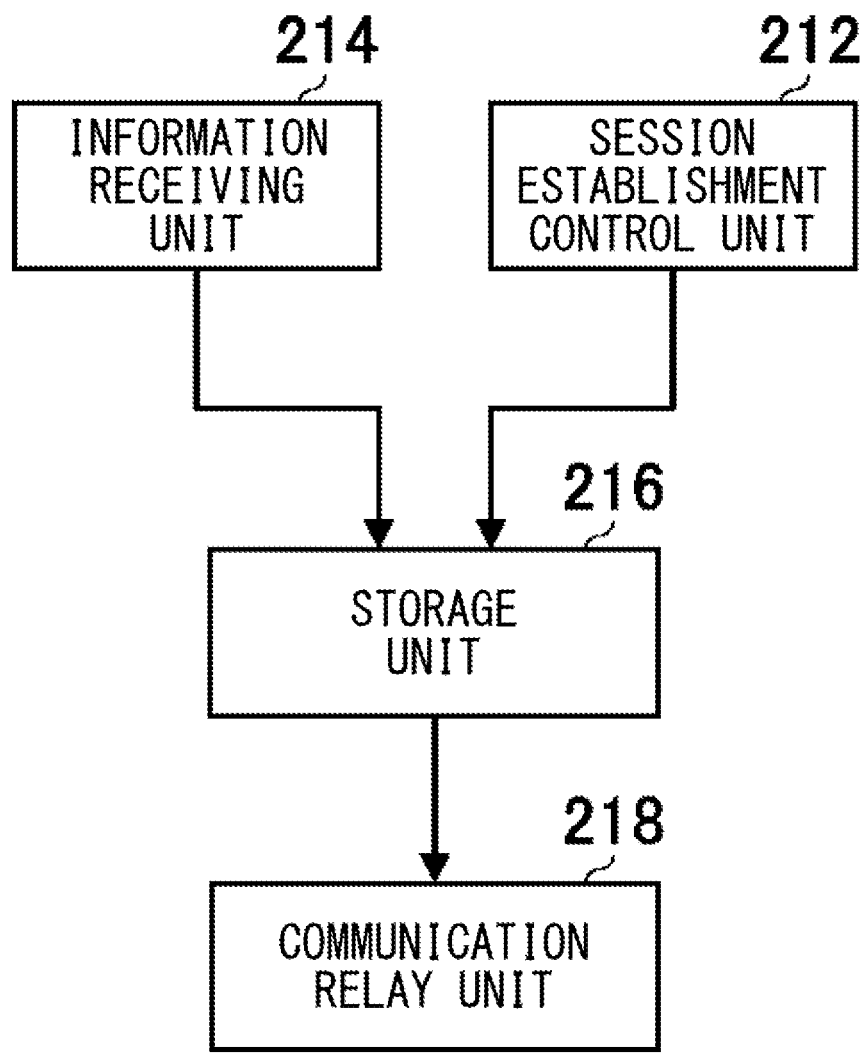
FIG. 8 schematically illustrates one example of a functional configuration of an MEC SGW-U 200.

FIG. 8 schematically illustrates one example of a functional configuration of the MEC SGW-U 200. The MEC SGW-U 200 includes a session establishment unit 212, an information receiving unit 214, a storage unit 216 and a communication relay unit 218.

The session establishment unit 212 is configured to establish a session with the control plane device in between, which has received the session generating request transmitted by the mobility management device that has received the connection request from the user terminal communicating with the MEC server. The session establishment unit 212 is configured to establish a session with the MEC S/PGW-C 100 in between, under the control of the session establishment control unit 160, for example.

The information receiving unit 214 is configured to receive various types of information from the control plane device. The information receiving unit 214 is configured to receive the information about the wireless base station with the user terminal in-communication from the control plane device, for example. The information receiving unit 214 may be one example of the base station information receiving unit. As a specific example, the information receiving unit 214 is configured to receive the information about the connection of the eNB 30 included in "Modify Bearer Request" from the MEC S/PGW-C 100 according to the Sx Session modification procedure. The information receiving unit 214 may be configured to store the received information in the storage unit 216.

The communication relay unit 218 is configured to relay the communication between the user terminal and the MEC server. The communication relay unit 218 is configured to relay the communication between the user terminal and the MEC server without going through the PGW-U. The communication relay unit 218 may be configured to relay the communication between the user terminal and the MEC server without going through any PGW-U.

The communication relay unit 218 is configured to relay the communication between the UE 500 and the MEC server 300, for example. The communication relay unit 218 may be configured to relay the communication between the UE 500 and the MEC server 300 via the network 400 corresponding to the MEC SGW-U 200, without going through the Dummy MEC PGW-U 102.

Figure 9:
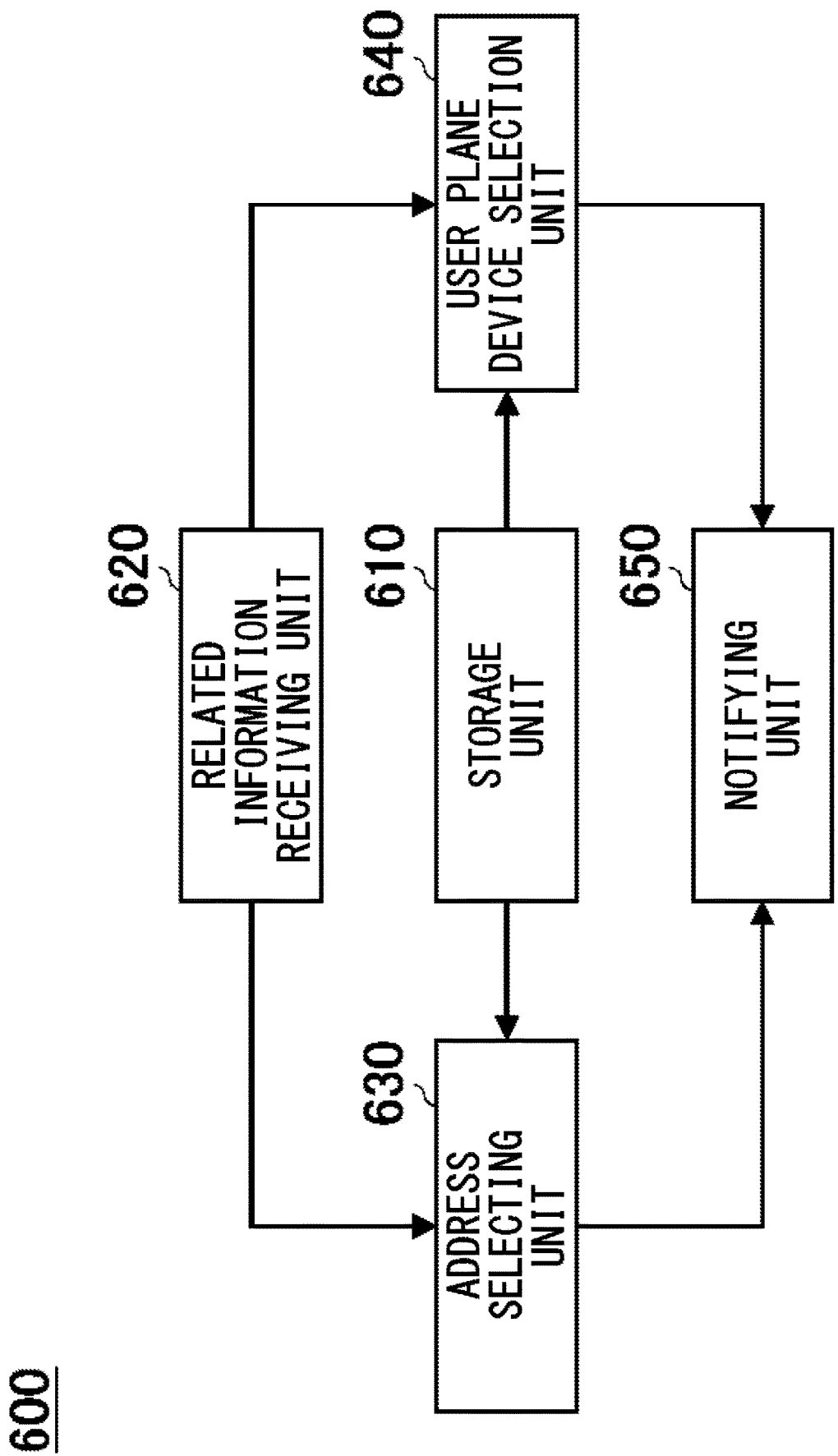
FIG. 9 schematically illustrates one example of a functional configuration of a PCRF (Policy and Charging Rule Function) 600.

FIG. 9 schematically illustrates one example of a functional configuration of the PCRF 600. The PCRF 600 may be one example of an information processing apparatus. The PCRF 600 includes a storage unit 610, a related information receiving unit 620, an address selecting unit 630, a user plane device selection unit 640 and a notifying unit 650.

The storage unit 610 is configured to store the information similar to the storage unit 110. The storage unit 610 may be configured to receive and store the information stored in the storage unit 110 from the MEC S/PGW-C 100. The related information receiving unit 620 is configured to receive the information transmitted by the related information transmission unit 132.

The address selecting unit 630 is configured to select the IP address to be assigned to the user terminal from the common address range that is common to each of the plurality of networks corresponding to each of the plurality of user plane devices, based on the related information received by the related information receiving unit 620. The address selecting unit 630 may be configured to select the IP address to be assigned to the user terminal from the common address range stored in the storage unit 610, by the process similar to the address acquiring unit 130.

The user plane device selection unit 640 is configured to select the user plane device corresponding to the user terminal from the plurality of user plane devices, based on the related information received by the related information receiving unit 620. The user plane device selection unit 640 may be configured to select the user plane device corresponding to the user terminal from the plurality of user plane devices, by the process similar to the user plane device selection unit 140.

The notifying unit 650 is configured to notify the MEC S/PGW-C 100 of the IP address selected by the address selecting unit 630. Also, the notifying unit 650 is configured to notify the MEC S/PGW-C 100 of the identification information for identifying the user plane device selected by the user plane device selection unit 640. The notifying unit 650 may be configured to notify the MEC S/PGW-C 100 of the identification information, IP address and port of the user plane device selected by the user plane device selection unit 640.

Figure 10:
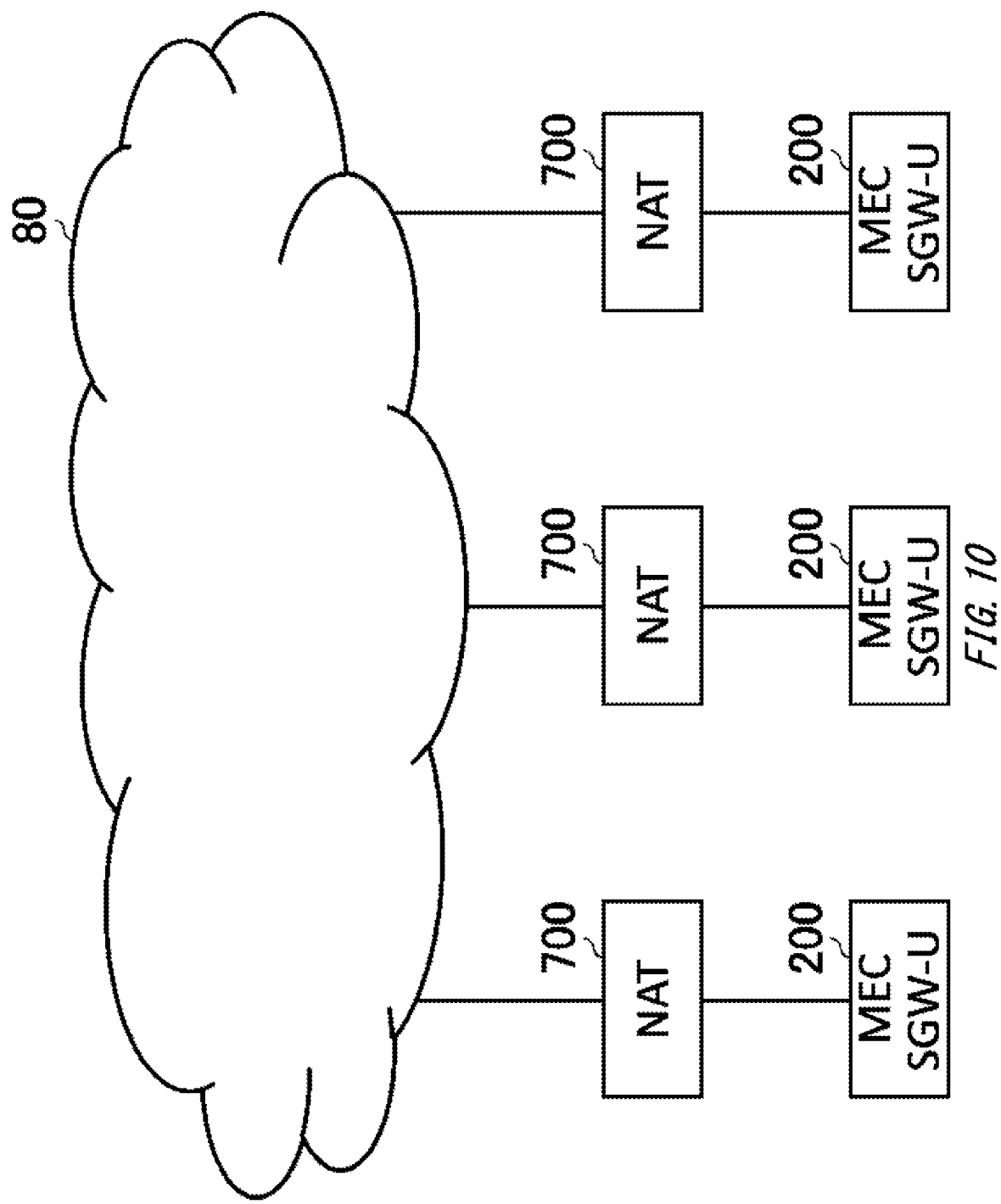
FIG. 10 schematically illustrates one example of a network configuration of a plurality of the MEC SGW-U (Serving Gateway-User) 200.

FIG. 10 schematically illustrates one example of a network configuration of the plurality of MEC SGW-U 200. Each of the plurality of MEC SGW-U 200 according to the present embodiment may be connected with the network 80 via NAT (Network Address Translation) 700, as illustrated in FIG. 10.

Since the common address range is assigned to the plurality of MEC SGW-U 200 according to the present embodiment, it is not possible to connect to the network 80 as it is. However, by arranging the NAT 700 for each of the plurality of MEC SGW-U 200, the plurality of MEC SGW-U 200 can be connected to the network 80. This enables the plurality of MEC server 300 to be in conjunction with each other via the network 80, for example.

The NAT 700 may also be deployed inside the MEC server 300. Also, the NAT 700 may also be deployed between the MEC server 300 and the network 80.

Figure 11:
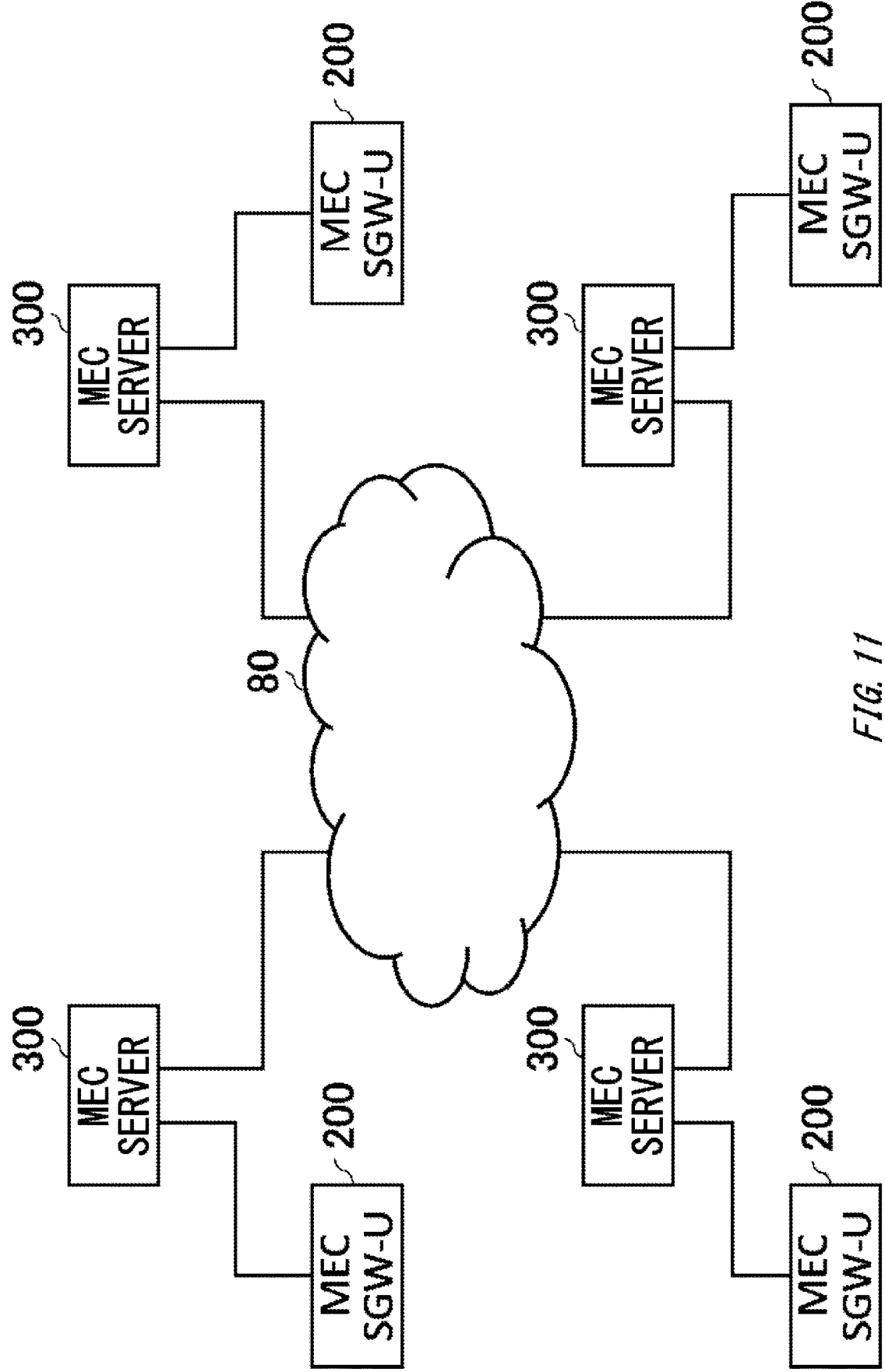
FIG. 11 schematically illustrates one example of a network configuration of a plurality of MEC servers 300.

FIG. 11 schematically illustrates one example of a network configuration of the plurality of MEC server 300. The plurality of MEC server 300 according to the present embodiment, as illustrated in FIG. 11, may have two or more ports, and be connected with the MEC SGW-U 200 via the first port, and be connected with the network 80 by the second port. This enables the plurality of MEC server 300 to be in conjunction with each other via the network 80.

Figure 12:
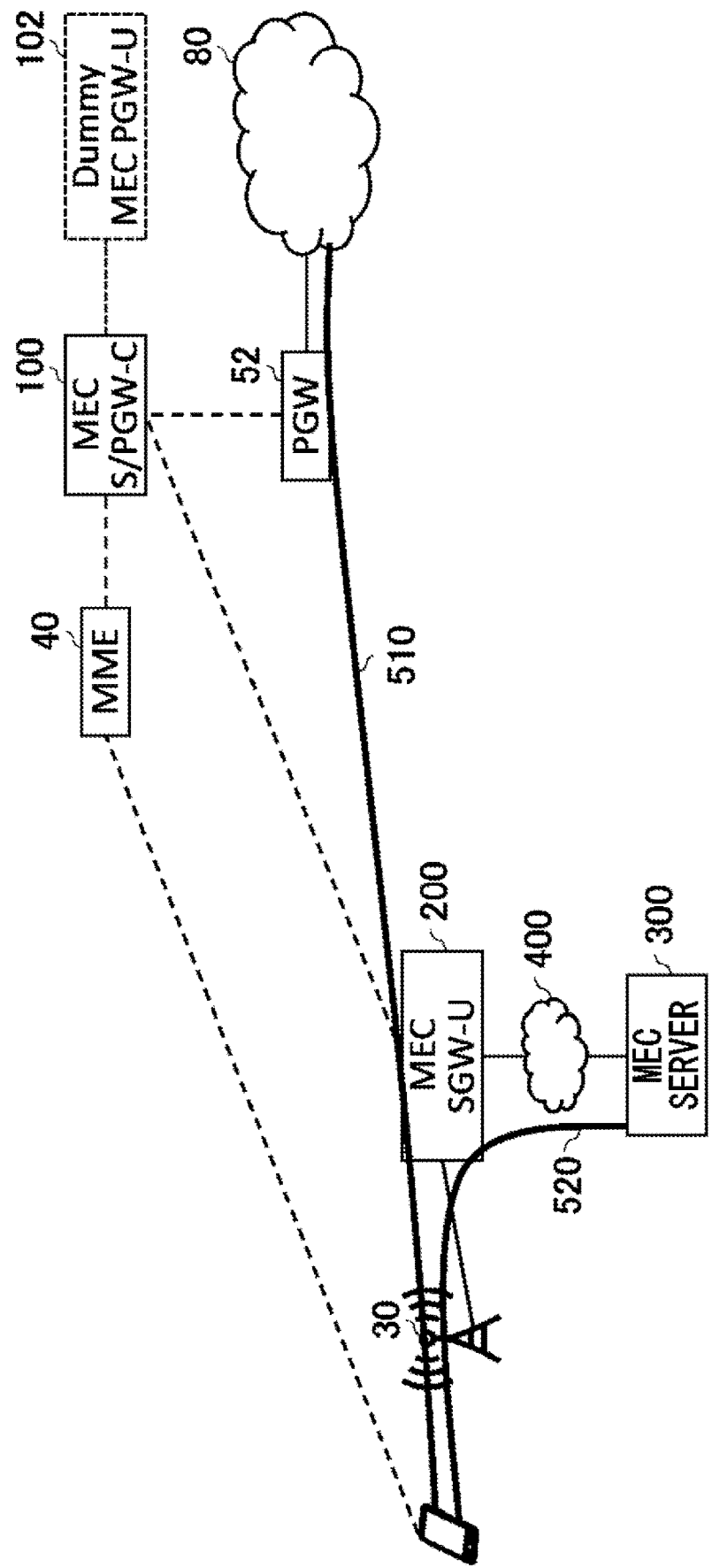
FIG. 12 schematically illustrates one example of a communication path of the UE (User Equipment) 500 with a plurality of sessions.

FIG. 12 schematically illustrates one example of a communication path of the UE 500 with a plurality of sessions. Herein, the case where the UE 500 has a voice communication session and a data communication session, and communicates with the MEC server 300 by the data communication session is exemplified.

In the example illustrated in FIG. 12, for the voice communication by the UE 500, the MEC S/PGW-C 100 may function as the SGW-C, the MEC SGW-U 200 may function as the SGW-U and be configured to relay the packet between the UE 500 and the network 80 via the PGW 52, as illustrated in the path 510. Also, for the data communication by the UE 500, the MEC SGW-U 200 may be configured to relay the packet between the UE 500 and the MEC server 300 via the network 400, as illustrated in the path 520.

Figure 13:
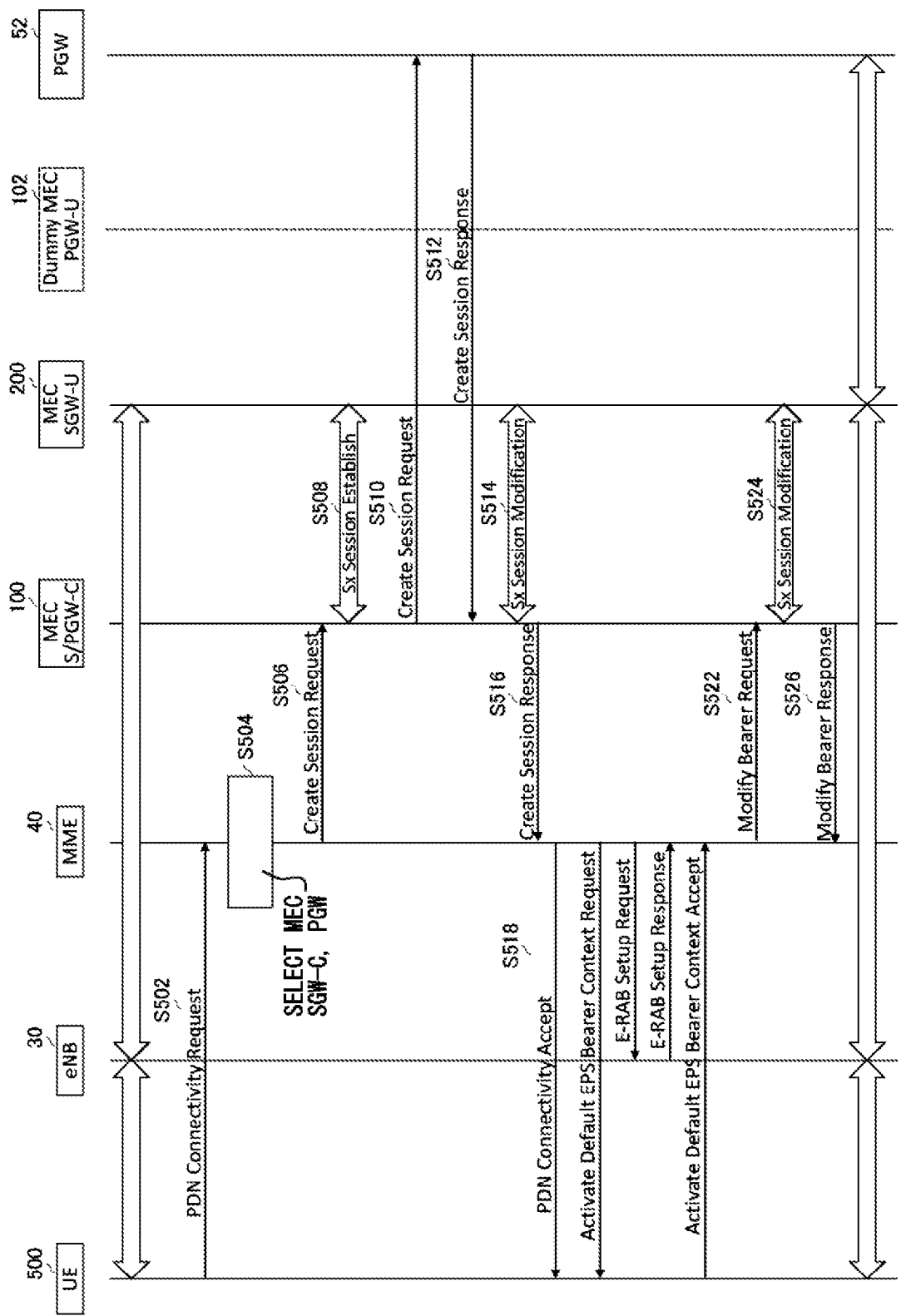
FIG. 13 schematically illustrates one example of a flow of a process in the system 10.

FIG. 13 schematically illustrates one example of a flow of a process in the system 10. Herein, a flow of a process by the system 10 in a case where the UE 500 has a plurality of sessions is illustrated. In FIG. 13, according to the process illustrated in FIG. 3, the state in which the MEC SGW-U 200 has been assigned to the UE 500 is described as an initial state.

In S502, the UE 500 is configured to transmit "PDN Connectivity Request" to the MME 40 via the eNB 30. Herein, an APN different from the predetermined APN for MEC is described to be included in the "PDN Connectivity Request" subsequently. In S504, the MME 40 is configured to select the MEC SGW-C and PGW 52 based on a condition that the APN included in "PDN Connectivity Request" is not the predetermined APN for MEC.

In S506, the MME 40 is configured to transmit "Create Session Request" to the MEC S/PGW-C 100. In S508, according to the Sx Session establishment procedure, the session of the eNB 30 and the MEC SGW-U 200 is established as that for the UE 500.

In S510, the MEC S/PGW-C 100 is configured to transmit "Create Session Request" to the PGW 52, and to notify the PGW 52 of the connection information of the MEC SGW-U 200. The PGW 52 is configured to establish the session of the MEC SGW-U 200 and the PGW 52 as that for the UE 500. In S512, the PGW 52 is configured to transmit "Create Session Response" to the MEC S/PGW-C 100, and to notify it of the connection information of the PGW 52.

In S514, the MEC S/PGW-C 100 is configured to notify of the connection information of the PGW 52 according to the Sx Session modification procedure, and to establish the session between the MEC SGW-U 200 and the PGW 52 as that for the UE 500. In S516, the MEC S/PGW-C 100 is configured to transmit "Create Session Response" to the MME 40, and to notify it of the connection information of the MEC SGW-U 200. In S518, the MME 40 is configured to transmit "Activate Default EPS Bearer Context Request" to the UE 500 and to notify it of the IP address of the UE 500. Also, the MME 40 is configured to transmit the "E-RAB Setup Request" to the eNB 30, to notify it of the connection information of the MEC SGW-U 200, and the eNB 30 is configured to establish the session of the eNB 30 and the MEC SGW-U as that for the UE 500. The UE 500 is configured to notify the MME 40 that the generation of the session has been completed by "Avtivate Default EPS Bearer Context Accept". Also, the eNB 30 is configured to notify the MME 40 of the connection information of the eNB 30 by "E-RAB Setup Response".

In S522, the MME 40 is configured to transmit "Modify Bearer Request" to the MEC S/PGW-C 100, and to notify it of the connection information of the eNB 30. In S524, the MEC S/PGW-C 100 is configured to notify the MEC SGW-U 200 of the connection information of the eNB 30 according to the Sx Session modification procedure with the MEC SGW-U 200 in between, and the MEC SGW-U is configured to update the information about the eNB 30 of the session for the UE 500. In S526, the MEC S/PGW-C 100 is configured to transmit "Modify Bearer Response" to the MME 40, and to notify that the session for the UE 500 has been established.

According to the above-described flow, in addition to the session with respect to the APN for MEC, the session with respect to the APN that is not for MEC can be generated, and the UE 500, for example, for the voice communication session, can be configured to communicate with the network 80 via the PGW 52, and for the data communication session, can be configured to communicate with the MEC server 300 via the MEC SGW-U 200.

Figure 14:
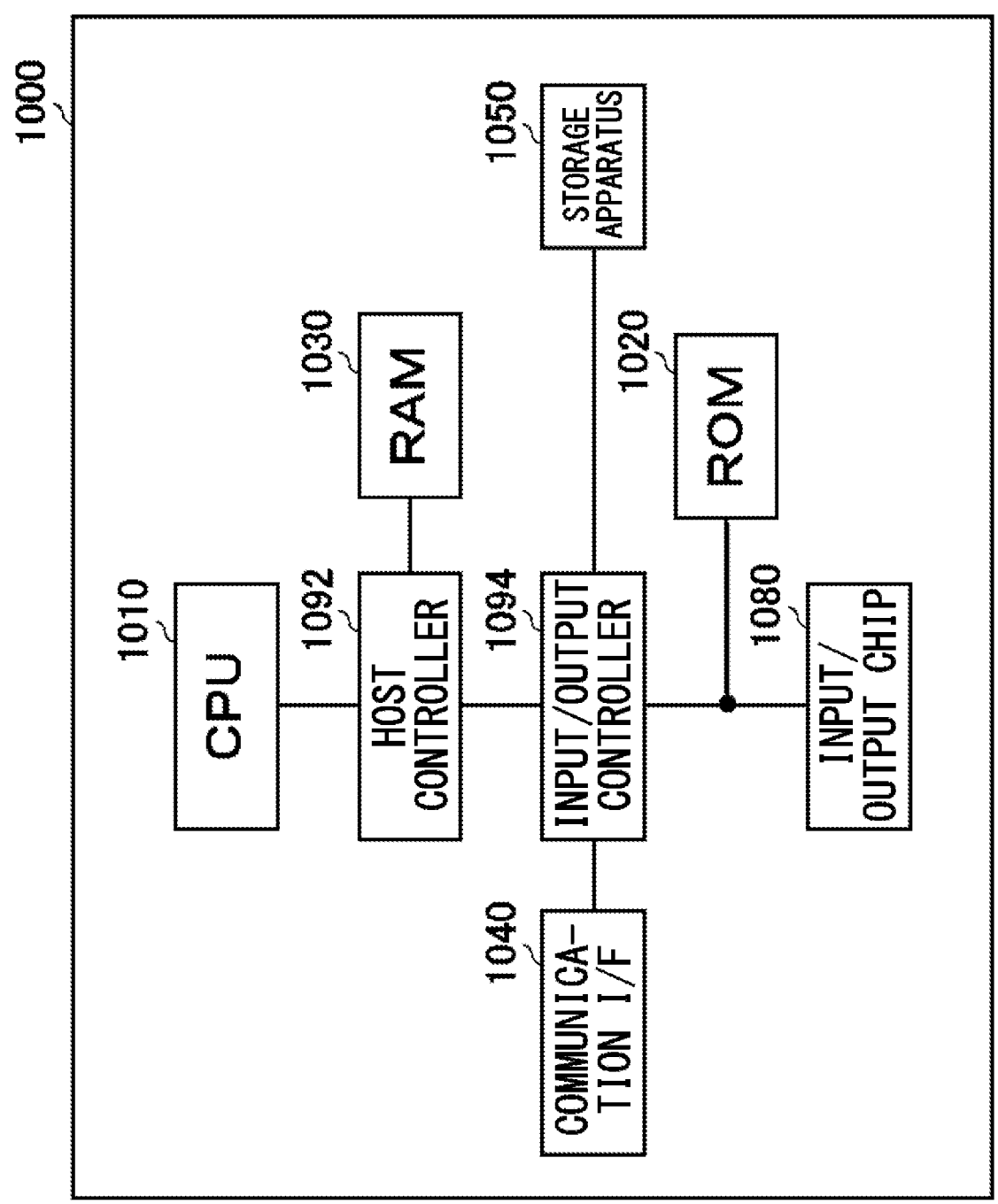
FIG. 14 schematically illustrates one example of a hardware configuration of a computer 1000 which functions as the MEC S/PGW-C 100, the MEC SGW-U 200 or the PCRF 600.

FIG. 14 schematically illustrates one example of a computer 1000 for functioning as a MEC S/PGW-C 100, a MEC SGW-U 200, or a PCRF 600. The computer 1000 according to the present embodiment includes a CPU peripheral unit including a CPU 1010 and a RAM 1030, which are mutually connected by a host controller 1092, and an input/output unit including a ROM 1020, a communication I/F 1040, a storage device 1050 and an input/output chip 1080, which are connected to the host controller 1092 by an input/output controller 1094.

The CPU 1010 is configured to operate based on programs stored in the ROM 1020 and the RAM 1030, thereby controlling each unit. The communication I/F 1040 communicates with another apparatus via the network by wiring or wireless. The communication I/F 1040 also functions as hardware for performing communication. The storage device 1050 may be a hard disk drive, a solid state drive and so on, is configured to store program and data using the CPU 1010.

The ROM 1020 is configured to store the boot program or the like that the computer 1000 executes at startup and programs that depend on the hardware of the computer 1000. The input/output chip 1080 connects various input/output apparatuses to the input/output controller 1094 via, for example, a USB port, a parallel port, a serial port, a keyboard port, a mouse port and so on.

The program provided to the storage device 1050 via RAM 1030 is stored in a recording medium such as a USB memory and an IC card and provided by the user. The program is read from the recording medium, installed into the storage device 1050 via the RAM 1030, and executed by the CPU 1010.

A program that is installed in the computer 1000 and causes the computer 1000 to function as the MEC S/PGW-C100, the MEC SGW-U200, or the PCRF600 may respectively act on the CPU 1010 or the like to cause the computer 1000 to function as the respective units of the MEC S/PGW-C100, the MEC SGW-U200, or the PCRF600. The information processing described in these programs, by being read into the computer 1000, functions as the storage unit 110, the request receiving unit 120, the address acquiring unit 130, the related information transmission unit 132, the user plane device selection unit 140, the response transmission unit 150, the identification information receiving unit 152 and the session establishment control unit 160, as the specific means by which the software and the various hardware resources described above cooperate. Also, the information processing described in these programs, by being read into the computer 1000, functions as the session establishment unit 212, the information receiving unit 214, the storage unit 216 and the communication relay unit 218, as the specific means by which the software and the various hardware resources described above cooperate. Also, the information processing described in these programs, by being read into the computer 1000, functions as the storage unit 610, the related information receiving unit 620, the address selecting unit 630, the user plane device selection unit 640 and the notifying unit 650, as the specific means by which the software and the various hardware resources described above cooperate. Then, depending on these specific means, by realizing the information computing or processing according to the use purpose of the computer 1000 in the present embodiment, the MEC S/PGW-C 100, the specific MEC SGW-U 200 or the PCRF 600 according to the use purpose are established.

In the above-described embodiment, the MEC S/PGW-C 100 has been described as one example of the control plane device, but it is not limited to this. For example, when the system 10 is applied to the 5G (5th Generation) communications system, at least any of the AMF (Access and Mobility management Function) and the SMF (Session Management Function) may function as the control plane device.

Also, in the above-described embodiment, the MEC SGW-U 200 has been described as one example of the user plane device, but it is not limited to this. For example, when the system 10 is applied to the 5G communication system, the UPF (User Plane Function) may function as the user plane device.

Also, in the above-described embodiment, the MME 40 has been described as one example of the mobility management device, but it is not limited to this. For example, when the system 10 is applied to the 5G communication system, the AMF may function as the mobility management device.

Also, in the above-described embodiment, the PCRF 600 has been described as one example of the policy control unit, but it is not limited to this. For example, when system 10 is applied to the 5G communication system, the PCF (Policy Control Function) may function as the policy control unit.

When the system 10 is applied to the 5G communication system, the above-described APN may be a DNN (Data Network Name).

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system; 20: backhaul; 30, 31, 32: eNB; 34: Source eNB; 35: Target eNB; 40:MME; 50: S/PGW; 51: SGW; 52: PGW; 53: S/PGW-C; 54: SGW-C; 55: PGW-C; 56: SGW-U; 57: PGW-U; 58: Source SGW-U; 59: Target SGW-U; 80: network; 100: MEC S/PGW-C; 102: Dummy MEC PGW-U; 110: storage unit; 120: request receiving unit; 130: address acquiring unit; 132: related information transmission unit; 140: user plane device selection unit; 150: response transmission unit; 152: identification information receiving unit; 160: session establishment control unit; 200: MEC SGW-U; 201, 202: Local MEC SGW-U; 203: Central MEC SGW-U; 204: Source U-plane device; 205: Target U-plane device; 212: session establishment unit; 214: information receiving unit; 216: storage unit; 218: communication relay unit; 300, 301, 302, 303, 304, 305: MEC server; 310, 318, 319: server; 400, 401, 402, 403: network; 500: UE; 510, 520: path; 600: PCRF; 610: storage unit; 620: related information receiving unit; 630: address selecting unit; 640: user plane device selection unit; 650: notifying unit; 700: NAT; 1000: computer; 1010: CPU; 1020: ROM; 1030: RAM; 1040: communication I/F; 1050: storage device; 1080: input/output chip; 1092: host controller; 1094: input/output controller

What is claimed is:

1. A system, comprising:
a control plane device; and
a plurality of user plane devices; wherein
the control plane device comprising:
a request receiving unit for receiving a session generating request transmitted by a mobility management device which has received a connection request from a user terminal;

a user plane device selection unit for selecting a user plane device corresponding to the user terminal from the plurality of user plane devices, based on the session generating request;
an address acquiring unit for obtaining an IP address to be assigned to the user terminal from a common address range that is common to a plurality of networks each corresponding to each of a plurality of user plane devices, based on the session generating request; and
a response transmission unit for transmitting a session generating response including the IP address to be assigned to the user terminal, identification information and IP address of the user plane device selected by the user plane device selection unit, and an IP address of a PGW-U, as a response to the session generating request, to the mobility management device; wherein
the user plane device selected by the user plane device selection unit is configured to relay communication between a server connected to a network corresponding to the user plane device among the plurality of networks and the user terminal, via the network instead of the PGW-U.

2. The system according to claim 1, wherein the response transmission unit is configured to transmit the session generating response including an IP address of a dummy PGW-U to the mobility management device.

3. The system according to claim 2, wherein the response transmission unit is configured to transmit the session generating response including an IP address of a dummy PGW-U, which satisfies a requirement of an S5/S8 PGW-U interface within a Bearer Context, to the mobility management device.

4. The system according to claim 1, wherein the control plane device is configured to establish a session with the user plane device selected by the user plane device selection unit, and not to establish a session with the PGW-U.

5. The system according to claim 2, wherein the control plane device is configured to establish a session with the user plane device selected by the user plane device selection unit, and not to establish a session with the PGW-U.

6. The system according to claim 1, wherein the user plane device selection unit is configured to select a user plane device corresponding to the user terminal from the plurality of user plane devices, based on at least any of serving area information of the user terminal, an APN (Access Point Name) or a DNN (Data Network Name) configured for the user terminal, an IMSI (International Mobile Subscriber Identity) of the user terminal, an IMEI (International Mobile Equipment Identity) of the user terminal, and load conditions of the plurality of user plane devices.

7. The system according to claim 1, wherein:
the user plane device selection unit is configured to select a second user plane device corresponding to a second wireless base station as a user plane device corresponding to the user terminal, when the user terminal performs handover from a first wireless base station to the second wireless base station after selecting a first user plane device corresponding to the user terminal that is served by a first wireless base station;
the response transmission unit is configured to transmit identification information for identifying the second user plane device selected by the user plane device selection unit to the mobility management device.

8. The system according to claim 7, when the user terminal performs handover from the first wireless base station to the second wireless base station, wherein:
the user plane device selection unit is configured to select the second user plane device as a user plane device corresponding to the user terminal; and
the system is configured not to change the IP address assigned to the user terminal when the response transmission unit is configured to transmit identification information for identifying the second user plane device to the mobility management device.

9. The system according to claim 1, wherein:
the control plane device comprises
a related information transmission unit for transmitting related information that is related to the user terminal to an external device; wherein
the address acquiring unit is configured to receive an IP address selected from the common address range based on the related information by the external device from the external device.

10. The system according to claim 9, wherein:
the control plane device comprises
an identification information receiving unit for receiving identification information for identifying a user plane device corresponding to the user terminal selected from a plurality of the user plane devices based on the related information by the external device, wherein
the response transmission unit is configured to transmit the identification information received by the identification information receiving unit to the mobility management device.

11. The system according to claim 1, wherein:
the control plane device comprises
a related information transmission unit for transmitting related information that is related to the user terminal to an external device; and
an identification information receiving unit for receiving identification information identifying a user plane device corresponding to the user terminal selected from a plurality of the user plane devices based on the related information by the external device; wherein
the response transmission unit is configured to transmit the identification information received by the identification information receiving unit to the mobility management device.

12. The system according to claim 1, wherein:
the request receiving unit is configured to receive the session generating request that the mobility management device having received the connection request from the user terminal transmits in response to a predetermined condition being met;
wherein the predetermined condition is at least any of facts that the connection request includes an predetermined APN or DNN for MEC (Mobile Edge Computing), the user terminal IMSI is a IMSI predetermined for MEC, and the user terminal IMEI is an IMEI predetermined for MEC.

13. The system according to claim 1, wherein the request receiving unit is configured to receive the session generating request transmitted, based on at least any of a load condition and an assignment status of at least any of the control plane device and a plurality of the user plane devices, by the mobility management device that has received the connection request from the user terminal.

14. The system according to claim 1, wherein the address acquiring unit is configured to obtain an IP address to be assigned to the user terminal from one common address range selected from a plurality of the common address ranges.

15. The system according to claim 14, wherein the address acquiring unit is configured to select one common address range from a plurality of the common address ranges based on at least any of an APN or DNN configured for the user terminal, the user terminal IMSI, the user terminal IMEI, a load condition and an assignment status of a plurality of the user plane devices, and an assignment status of a plurality of the common address ranges.

16. The system according to claim 1, wherein:
the request receiving unit is configured to receive a first session generation request for requesting a generation of a session for MEC of the user terminal and a second session generation request for requesting a generation of a session that is not for MEC of the user terminal, from the mobility management device; wherein
the control plane device comprises
a session establishment control unit for controlling to establish a session between a user plane device selected from a plurality of the user plane devices for MEC and a wireless base station with a serving user terminal, as a session for MEC of the user terminal, based on the first session generation request, and to establish a session between a PGW that is not for MEC and a wireless base station with a serving user terminal, as a session that is not for MEC of the user terminal, based on the second session generation request.

17. The system according to claim 1, wherein:
the plurality of the user plane devices is a SGW-U (Serving Gateway-User); and
the mobility management device is an MME (Mobility Management Entity).

18. The system according to claim 17, wherein the control plane device is SGW-C(Serving Gateway-Control) and PGW-C(PDN (Packet Data Network) Gateway-Control).

19. A control plane device, comprising:
a request receiving unit for receiving a session generating request transmitted by a mobility management device that has received a connection request from a user terminal;
a user plane device selection unit for selecting a user plane device corresponding to the user terminal from a plurality of user plane devices based on the session generating request;
an address acquiring unit for obtaining an IP address to be assigned to the user terminal from a common address range that is common to each of a plurality of networks corresponding to each of a plurality of user plane devices based on the session generating request;
a response transmission unit for transmitting a session generating response including the IP address to be assigned to the user terminal, identification information and an IP address of the user plane device selected by the user plane device selection unit, and an IP address of a PGW-U of a dummy, to the mobility management device, as a response to the session generating request.

20. A control plane device, comprising:
a request receiving unit for receiving a session generating request transmitted by a mobility management device that has received a connection request from a user terminal;
a user plane device selection unit for selecting a user plane device corresponding to the user terminal from a plurality of the user plane devices based on the session generating request;
an address acquiring unit for obtaining an IP address to be assigned to the user terminal from a common address range that is common to each of a plurality of networks corresponding to each of a plurality of user plane devices based on the session generating request; and
a response transmission unit for transmitting a session generating response including the IP address to be assigned to the user terminal, identification information and an IP address of the user plane device selected by the user plane device selection unit, and an IP address of PGW-U, to the mobility management device, as a response to the session generating request; wherein
the control plane device is configured to establish a session with the user plane device selected by the user plane device selection unit in between, and not to establish a session with the PGW-U in between.

* * * * *